United States Patent
Ryu

(10) Patent No.: US 8,728,822 B2
(45) Date of Patent: May 20, 2014

(54) METHOD, APPARATUS, AND RECORDING MEDIUM FOR PERFORMANCE GAME

(75) Inventor: Hwi-Man Ryu, Anyang-si (KR)

(73) Assignee: Neowiz Games Co., Ltd., Seongnam-Si, Gyeonggi-Do (KR)

( * ) Notice: Subject to any disclaimer, the term of this patent is extended or adjusted under 35 U.S.C. 154(b) by 398 days.

(21) Appl. No.: 13/117,835

(22) Filed: May 27, 2011

(65) Prior Publication Data

US 2011/0294577 A1  Dec. 1, 2011

(30) Foreign Application Priority Data

May 28, 2010  (KR) .................. 10-2010-0050531

(51) Int. Cl.
*G06F 17/00* (2006.01)
*G10H 1/36* (2006.01)

(52) U.S. Cl.
CPC .......... *G10H 1/36* (2013.01); *A63F 2300/6081* (2013.01); *A63F 2300/8047* (2013.01)
USPC ................. 436/35; 436/37; 84/600

(58) Field of Classification Search
CPC .............. G10H 1/36; A63F 2300/8047; A63F 2300/6081
USPC ........................ 463/35, 37; 84/600
See application file for complete search history.

(56) References Cited

U.S. PATENT DOCUMENTS

| | | | | |
|---|---|---|---|---|
| 5,513,129 A * | 4/1996 | Bolas et al. | ...................... | 703/13 |
| 5,990,405 A * | 11/1999 | Auten et al. | .................... | 84/609 |
| 7,151,214 B2 * | 12/2006 | Barry | ................ | 84/600 |
| 8,317,614 B2 * | 11/2012 | McCauley et al. | ................ | 463/37 |
| 8,414,395 B2 * | 4/2013 | Oberg et al. | ...................... | 463/37 |
| 2005/0245315 A1* | 11/2005 | Shimizu et al. | ................... | 463/37 |
| 2007/0256541 A1* | 11/2007 | McCauley | ..................... | 84/600 |

FOREIGN PATENT DOCUMENTS

| | | |
|---|---|---|
| JP | 11151380 | 6/1999 |
| JP | 2000254351 A | 9/2000 |
| JP | 2009531153 A | 9/2009 |
| JP | 201036038 A | 2/2010 |

OTHER PUBLICATIONS xryanxgh, "Patent Pending—Cheer up Emo Kid", Youtube, Nov. 11, 2008, http://www.youtube.com/watch?v=gI9ITtcBnD4.*
Japanese Office Action for 2011-118628, dated Jun. 4, 2013.

* cited by examiner

*Primary Examiner* — Michael Cuff
(74) *Attorney, Agent, or Firm* — Lowe Hauptman & Ham, LLP

(57) ABSTRACT

Disclosed is a performance game, and more particularly is a method, an apparatus, and a recording medium for a performance game, which can provide various presentation effects with a simple presentation operation of a user.

23 Claims, 19 Drawing Sheets

FIG. 3
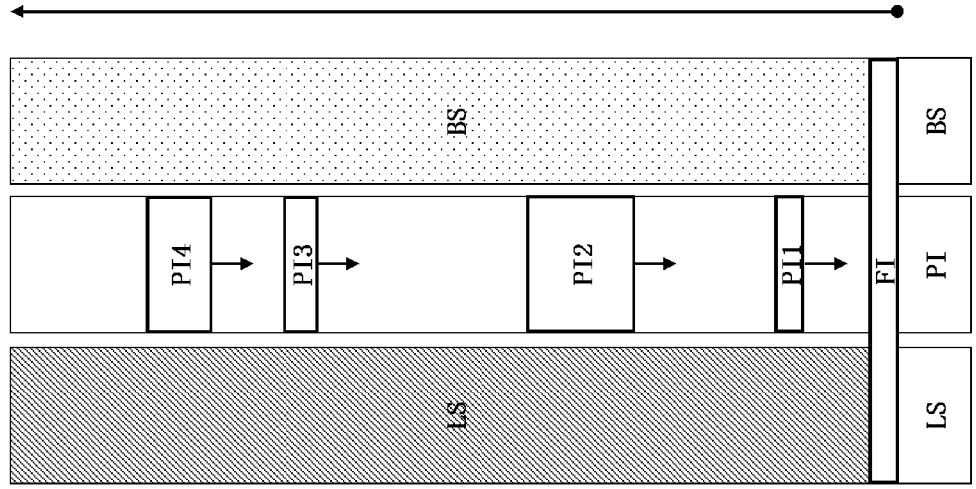
(b)
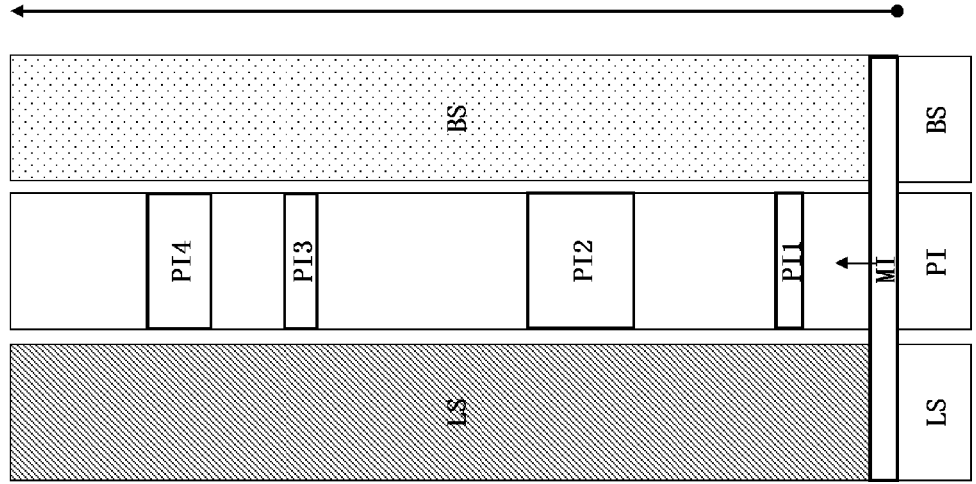
(a)

METHOD, APPARATUS, AND RECORDING MEDIUM FOR PERFORMANCE GAME

CROSS-REFERENCE TO RELATED APPLICATION

This application claims priority from and the benefit under 35 U.S.C. §119(a) of Korean Patent Application No. 10-2010-0050531, filed on May 28, 2010, which is hereby incorporated by reference for all purposes as if fully set forth herein.

BACKGROUND OF THE INVENTION

1. Field of the Invention

The present invention relates to a performance game, and more particularly to a method, an apparatus, and a recording medium for a performance game, which can provide various presentation effects with a simple presentation operation of a user.

2. Description of the Prior Art

As generally known in the art,

In a conventional performance game, it is general that when a user plays music through a performance operation, a clip, such as a predetermined audio and visual clip, is simply outputted from a beginning part.

Such a conventional performance game scheme has a problem in that it cannot satisfy a user's desire for a game and a user's interest in the game is reduced after playing the game several times.

SUMMARY OF THE INVENTION

Accordingly, the present invention has been made to solve the above-mentioned problems occurring in the prior art, and an object of the present invention is to provide a sound-based performance game capable of providing various presentation effects only with the simple presentation operation of the user.

Another object of the present invention is to provide a sound-based performance game capable of freely and variously presenting the image, as well as the sound, with the simple presentation operation of the user.

In order to accomplish this object, there is provided an apparatus for a performance game, the apparatus including: a sound setting unit for synchronizing a single first performance sound source with a background sound and setting the first performance sound source, or for synchronizing multiple second performance sound sources with one or more sections of the background sound, respectively, and setting the second performance sound sources; a performance input unit for receiving an input of a performance input signal; and a sound output controller for, during the reproduction and output of the background sound, when the performance input signal is inputted, controlling an output of the first performance sound source during an input duration of the performance input signal from a specific point of the first performance sound source based on an input time of the performance input signal, or controlling an output of a specific second performance sound source during an input duration of the performance input signal from a specific point of the specific performance sound source among the multiple second performance sound sources based on an input time of the performance input signal.

In accordance with another aspect of the present invention, there is provided a method for a performance game, the method including the steps of: synchronizing a single first performance sound source with a background sound and setting the first performance sound source or for synchronizing multiple second performance sound sources with one or more sections of the background sound, respectively, and setting the second performance sound sources; receiving an input of a performance input signal; and during the reproduction and output of the background sound, when the performance input signal is inputted, outputting the first performance sound source during an input duration of the performance input signal from a specific point of the first performance sound source based on an input time of the performance input signal, or outputting a specific second performance sound source during an input duration of the performance input signal from a specific point of the specific performance sound source among the multiple second performance sound sources based on an input time of the performance input signal, and controlling the background sound.

In accordance with another aspect of the present invention, there is provided a recording medium recording a program for an execution of a method for a performance game, the recording medium includes: a function of synchronizing a single first performance sound source with a background sound and setting the first performance sound source or for synchronizing multiple second performance sound sources with one or more sections of the background sound, respectively, and setting the second performance sound sources; and a function of, during the reproduction and output of the background sound, when the performance input signal is inputted, outputting the first performance sound source during an input duration of the performance input signal from a specific point of the first performance sound source based on an input time of the performance input signal, or outputting a specific second performance sound source during an input duration of the performance input signal from a specific point of the specific performance sound source among the multiple second performance sound sources based on an input time of the performance input signal, and controlling an output of the background sound.

In accordance with another aspect of the present invention, there is provided an apparatus for a performance game, the apparatus including: a storage device for storing a background sound and data of preset performance sound sources synchronized with a reproduction time of the background sound; an input device for receiving an input of a performance input signal; and a sound outputting device for outputting a performance sound source synchronized with a reproduction time of the background sound corresponding to an input time of the performance input signal among the preset performance sound sources for an input duration of the performance input signal during an output of the background sound.

In accordance with another aspect of the present invention, there is provided an apparatus for a performance game, the apparatus including: a storage device for storing a background sound and data of preset performance images synchronized with a reproduction time of the background sound; an input device for receiving an input of a performance input signal; and an image outputting device for outputting a performance image synchronized with a reproduction time of the background sound corresponding to an input time of the performance input signal among the preset performance images for an input duration of the performance input signal during a reproduction of the background sound.

In accordance with another aspect of the present invention, there is provided an apparatus for a performance game, the apparatus including: an input device for receiving an input of a performance input signal; and an output control device for, during a reproduction and an output of at least one of a sound and an image linked with the sound, when there is a preset control signal at an input time of the performance input signal, controlling an output state of at least one of the sound and the image in accordance with the control signal.

As described above, the present invention effectively provides the sound-based performance game capable of providing various presentation effects only with the simple presentation operation of the user.

Further, the present invention can effectively provide the sound-based performance game capable of freely and variously presenting the image, as well as the sound, with the simple presentation operation of the user.

BRIEF DESCRIPTION OF THE DRAWINGS

The above and other objects, features and advantages of the present invention will be more apparent from the following detailed description taken in conjunction with the accompanying drawings, in which:

FIGS. 3A and 3B are exemplary diagrams of a performance game scheme according to an embodiment of the present invention;

DETAILED DESCRIPTION OF THE PREFERRED EMBODIMENTS

Figure 1:
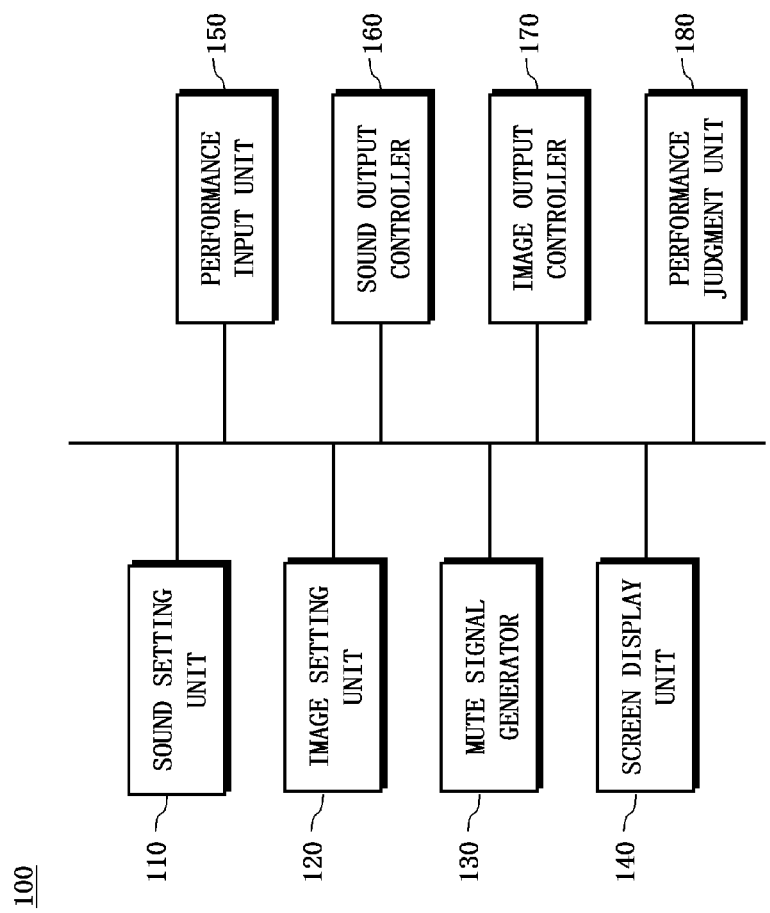
FIG. 1 is a block diagram illustrating a performance game apparatus according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a block diagram illustrating a performance game apparatus 100 according to an embodiment of the present invention.

The performance game apparatus 100 according to an embodiment of the present invention illustrated in FIG. 1 is an apparatus for providing a performance game, which controls an output of a corresponding performance sound source in accordance with a performance presentation operation of a user during an output of a background sound and enables the user to present the performance.

As illustrated in FIG. 1, the performance game apparatus 100 according to the embodiment of the present invention includes a sound setting unit 110 for synchronizing a single first performance sound source with a background sound and setting the first performance sound source or for synchronizing multiple second performance sound sources with one or more sections of a background sound, respectively, and setting the second performance sound sources, a performance input unit 150 for receiving an input of a performance input signal, and a sound output controller 160 for, during an input duration of the performance input signal, when the performance input signal is inputted during the reproduction and output of the background sound, controlling an output of the first performance sound source from a specific point of the first performance sound source based on an input time of the performance input signal, or controlling an output of a specific second performance sound source during an input duration of the performance input signal from a specific point of the specific performance sound source among the multiple second performance sound sources based on an input time of the performance input signal.

The aforementioned Background Sound (BS) may be a sound selected and set by a user or set by a default or a game environment setting value for the performance game.

Each of the first performance sound source and the second performance source may be at least one preset performance music or at least one preset performance sound. Here, the performance music refers to a sound source having the rhythm of a song and the performance sound refers to a sound of a specific musical instrument or a specific sound effect, rather than a sound having a rhythm.

The first performance sound source, which is a performance sound source synchronized with an total reproduction time of the BS, is a kind of performance sound source having an total reproduction time that is identical or almost similar to the total reproduction time of the BS. The second performance sound source, which is a performance sound source synchronized with a specific reproduction section of the BS, is another kind of performance sound source having an total reproduction time that is relatively shorter than that of the first performance sound source. In an aspect that the first performance sound source has the relatively long total reproduction time in comparison with the second performance sound source, the first performance sound source is referred to as a Long Performance Sound Source (LS) and the second performance sound source is referred to as a Short Performance Sound Source (SS).

The Performance Input Signal (IN), which is a signal generated by an operation of an input device by the user, may be defined by 'an input time' in which the user starts the operation of the input device and 'an input duration' during which the user continuously operates the input device. The input time is information related to a performance judgment on the timing of a performance presentation and a selection of a performance sound source to be outputted. The input duration is information related to a performance judgment on a duration of a performance presentation and an output duration of a selected performance sound source. The input device operated by the user in relation to the generation of the IN may be a separate input device shaped like a button or a stick, a touch screen or a touch pad receiving a touch input, or a touch input device processing a touch input. However, the input device is not limited thereto and may be implemented with any type of user operatable input device.

When the sound setting unit 110 has synchronized the first performance sound source with the BS and set the first performance sound source, the sound output controller 160 identifies a current reproduction point of the BS from the input time of the IN and outputs the first performance sound source together with the BS during the input duration from a specific time of the first performance sound source synchronized with the current reproduction point of the BS.

When the sound setting unit 110 has synchronized the multiple second performance sound sources with one or more sections of the BS and set the second performance sound sources, the sound output controller 160 determines if a specific second performance sound source synchronized with the section of the BS including the current reproduction point of the BS identified from the input time of the IN exists among the multiple synchronized second performance sound sources each of which is synchronized with the one or more sections of the BS. When the specific second performance sound source exists as a result of the determination, the sound output controller 160 outputs the specific second performance sound source together with the BS during the input duration from a specific point of the specific second performance sound source corresponding to the current reproduction point of the BS. However, when the specific second performance sound source does not exist as a result of the determination, the sound output controller 160 continuously outputs only the BS.

In the meantime, the performance game apparatus 100 according to the embodiment of the present invention, as illustrated in FIG. 1, may further include a mute signal generator 130 for generating a Mute Signal (MS) in a specific section of the BS.

The mute signal generator 130 may designate a start position and an end position for a MS generation time in accordance with setting information or user's setting. Further, the mute signal generator 130 may generate multiple MSs with different lengths or an identical length.

The mute signal generator 130 may control the output of the BS according to the generation of the MS. To this end, when the IN is inputted during the generation of the MS, the sound output controller 160 decreases a volume of the BS and outputs the BS or does not output the BS. When the generation of the MS is terminated, the sound output controller 160 reverts the decreased volume of the BS to the original volume and outputs the BS or outputs the BS that has not been outputted again.

Further, the mute signal generator 130 may generate the MS in a part with no performance sound source. Therefore, when the user makes a performance during the generation time of the MS, the mute signal generator 130 may create a presentation effect as if the BS (and a background image) is turned off for a short while.

As described above, the performance game apparatus 100 according to the embodiment of the present invention controls the output of the BS, as well as the output of the corresponding performance sound source, in accordance with the performance presentation operation of the user, during the output of the BS, so that it enables the user to present the various performances.

In the meantime, as illustrated in FIG. 1, the performance game apparatus 100 according to the embodiment of the present invention may further include an image setting unit 120 for setting a background image corresponding to the BS and a first performance image corresponding to the first performance sound source or second performance images corresponding to each of the multiple second performance sound sources, and an image output controller 170 for controlling the output of the BS, the first performance image, and at least one of the second performance images.

The image output controller 170 outputs the background image set corresponding to the BS during the reproduction of the BS. When the IN is inputted, the image output controller 170 controls the output of the background image based on the input time and the input duration of the IN, and outputs the first performance image corresponding to the first performance sound source from a specific point of the first performance sound source during the input duration or outputs the second performance image corresponding to the second performance sound source from a specific point of the second performance sound source among the multiple second performance sound sources during the input duration.

In the meantime, as described above, when the MS is generated by the mute signal generator 130, the output of the BS is controlled and the output of the background image may be also simultaneously controlled. To this end, when the IN is inputted during the generation of the MS in a specific section of the BS, the image output controller 170 may change a transparency degree or a color of the background image and output the changed background image or may make a control so that the background image is not outputted. For example, when the IN is generated during the existence of the MS, the image output controller 170 transparently outputs the background image or outputs the background image in a black color. Further, when the generation of the MS is terminated, the image output controller 170 may revert the transparency or the color of the background image to the original transparency or color and output the background image, or may output the background image again.

As described above, the performance game apparatus 100 according to the embodiment of the present invention controls the output of the image linked with the sound output control, as well as the sound output control including the output control of the corresponding performance sound source and the BS in accordance with the performance presentation operation of the user, so that it is possible to make the user present the performance for the sound and the image, thereby greatly increasing the user's interest in the performance game.

Each of the background image, the first performance image, and the second performance image may be a preset image or a preset image or picture.

The first performance image, which is a performance image corresponding to the first performance sound source (LS) that is the performance sound source synchronized with the total reproduction time of the BS, is a kind of performance image having an total reproduction time that is identical or almost similar to the total reproduction time of the BS. The second performance image, which is a performance image corresponding to the second performance sound source (LS) that is the performance sound source synchronized with the specific reproduction section of the BS, is a kind of performance image having an total reproduction time that is relatively shorter than that of the first performance image. Likewise to the fact that the first performance sound source is referred as the LS and the second performance sound source is referred to as the SS in the aspect that the first performance sound source has the relatively long total reproduction time in comparison with the second performance sound source, the first performance image may be referred to as a long performance image and the second performance image may be referred to as a short performance image.

In the meantime, as illustrated in FIG. 1, the performance game apparatus 100 according to the embodiment of the present invention may further include a screen display unit 140 for displaying one or more Performance Indicators (PIs) on a screen in order to indicate the input of the IN to the user.

The PI may be in a fixed type fixedly displayed on the screen or in a movable type displayed while moving in accordance with a reproduction flow of the BS.

When the PI is in the fixed type, the screen display unit 140 may further display a Moved Indicator (MI) displayed while moving in accordance with the reproduction flow of the BS. When the PI is in the movable type, the screen display unit 140 may further display a Fixed Indicator (FI) at a position which the PI moves to and reaches.

The PI functions to report a set point of the second performance sound source, in addition to a function of displaying the input (i.e. a performance presentation operation time) of the IN to the user. Therefore, the screen display unit 140 generally displays the PI at a position adjacent to the set point of the second performance sound source. However, in order to create variety and induce an interest in the performance game scheme, the screen display unit 140 may display the PI at a position in which the second performance sound source is not set.

Figure 5:
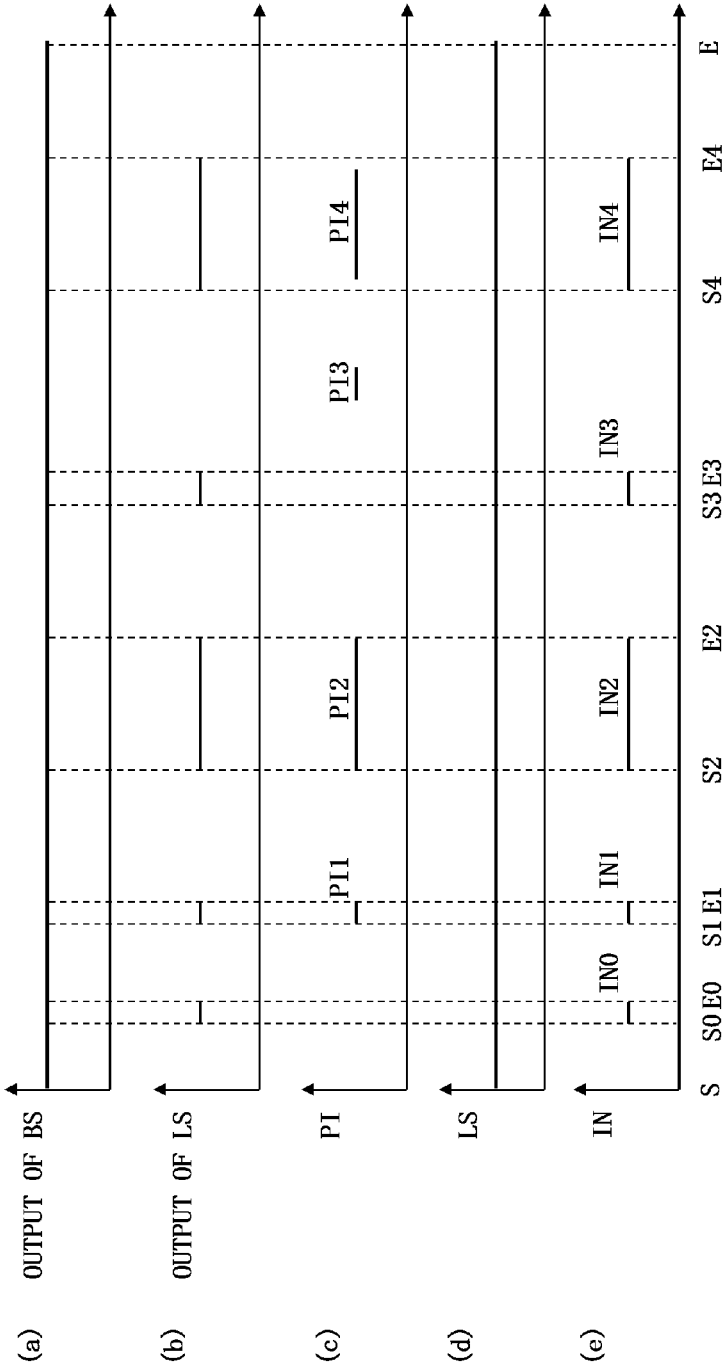
FIGS. 5A to 5E are signal graphs of a sound output control in the performance game of FIG. 4.

That is, the screen display unit 140 may display the PI at a position adjacent to the set point of the second performance sound source or at a position which is not related to the set point of the second performance sound source. Referring to FIG. 5, the PIs PI1, PI2, and PI4 are displayed at the positions adjacent to the set points of the second performance sound sources SS1, SS2, and SS4, and the PI PI3 is displayed at a position which is not related to the second performance sound source.

Further, each of the PIs may be displayed in an identical length or in different lengths in order to indicate an input duration of the IN to the user.

In the meantime, as illustrated in FIG. 1, the performance game apparatus 100 according to the embodiment of the present invention may further include a performance judgment unit 180 for judging a performance presentation according to the inputted IN.

When the IN is inputted, the performance judgment unit 180 compares a position of the PI and a position of another indicator at the input time of the IN and judges if it is the correct performance presentation timing according to the input of the IN, or compares the input duration of the IN and the length of the PI and judges if the a duration time of the performance presentation is correct. Here, the PI may be in a fixed type fixedly displayed on the screen or a movable type displayed while moving in accordance with the reproduction flow of the BS. The another indicator compared with the PI may be the MI displayed while moving in accordance with the reproduction flow of the BS when the PI is in the fixed type, and may be the FI at the position which the PI moves to and reaches when the PI is in the movable type.

Based on a result of the judgment on at least one of the timing and the duration of the performance presentation by the performance judgment unit 180, an output time or the output of at least one of the first performance sound source, the second performance sound source, the first performance image corresponding to the first performance sound source, and the second performance image corresponding to the second performance sound source may be controlled.

An example of the control of the output time of the performance sound source and/or the performance image based on the judgment result will be described.

Only when the performance judgment unit 180 judges that the position of the PI is accorded with a front position of another indicator at the input time of the IN so that the performance presentation timing is correct, and the input duration of the IN is accorded with the length (time length) of the PI so that the performance presentation duration is correct, the corresponding performance sound source or second performance sound source by the length of the PI is outputted through the sound output controller 160 and the corresponding performance image or second performance image by a length of the PI is outputted through the image output controller 170.

In addition to the strict scheme for outputting the performance sound source/performance image, which outputs the performance sound source (first performance sound source/first performance image or second performance sound source/second performance image) by the length of the PI only when the timing and the duration of the performance presentation are all accorded as described in the above example, there are lightened schemes for outputting the performance sound source/performance image in accordance with a game difficulty level, a gamer level, or a game option.

As one of the lightened schemes for outputting the performance sound source/performance image, even though the input duration of the IN is not accorded with the length of the PI so that the performance judgment unit 180 judges that the performance presentation duration is not correct, but the position of the PI is accorded with the front position of another indicator at the input time of the IN and judges that the performance presentation timing is correct, the corresponding first performance sound source or second performance sound source by the length of the PI is outputted through the sound output controller 160 and the corresponding first performance image or second performance image by the length of the PI is outputted through the image output controller 170.

As one of the more lightened schemes for outputting the performance sound source/performance image, even though the position of the PI is not accorded with the front position of the another indicator at the input time of the IN so that the performance judgment unit 180 judges that the performance presentation timing is not correct, and the input duration of the IN is not accorded with the length of the PI and the performance judgment unit 180 judges that the performance presentation duration is not correct, but the position of the PI is located at a center part of the another indicator at the input time of the IN, the corresponding first performance sound source or second performance sound source by the length of the PI is outputted through the sound output controller 160 and the corresponding first performance image or second performance image by the length of the PI is outputted through the image output controller 170.

It is possible to control whether to output the performance sound source and/or performance image based on the judgment result. When the performance judgment unit 180 judges that the performance is not correctly accorded with the PI as the result of the judgment (i.e. the timing and/or the duration of the performance presentation is incorrect), the corresponding performance sound source (the first performance sound source/first performance image or the second performance sound source/second performance image) may not be outputted.

In the meantime, based on the judgment result of the performance judgment unit 180, at least one of a sound effect and an image effect corresponding to an incorrect performance (i.e. the performance presentation judged as the incorrect performance presentation timing and/or duration) or a correct performance (the performance presentation judged as the correct performance presentation timing and/or duration) may be outputted.

For example, when it is judged that the performance for the PI is incorrect as the result of the performance judgment (i.e. when the timing and/or the duration of the performance presentation is incorrect), at least one of a sound effect and an image effect corresponding to the incorrect performance may be outputted, instead of the output of the corresponding performance sound source (first performance sound source or second performance sound source). At this time, the BS and/or the background image may be overlapped and outputted, or may not be outputted.

The performance game apparatus 100 according to the embodiment of the present invention may be an arcade game device used in an amusement hall, etc., a portable terminal including a Play Station Portable (PSP™), a Personal Digital Assistant (PDA), a Portable Media Player (PMP), a smart phone, and a mobile communication terminal, or a computer including a desktop computer and a laptop computer. However, the performance game apparatus 100 according to the embodiment of the present invention is not limited thereto and may be implemented with any device including an input device, a memory (storage device), a sound output device (e.g. a speaker), and an image output device (e.g. a display unit).

Up to now, the performance game apparatus 100 according to the embodiment of the present invention has been described. Hereinafter, examples of the construction of a performance game screen will be described with reference to FIGS. 2A and 2B and the performance game schemes according to the examples of the construction of the performance game screen of FIGS. 2A and 2B will be described with reference to FIGS. 3A and 3B. Further, a setting scheme of various elements (the PI, the performance sound source, the MS, etc.) for the user performance presentation and the control of the sound output according to the example of the performance presentation will be exemplarily described with reference to FIGS. 4 to 13. Hereinafter, the first performance sound source, the second performance sound source, the first performance image, and the second performance image will be described as the LS, the SS, the long performance image, and the short performance image, respectively.

FIGS. 2A and 2B are exemplary diagrams of a performance game screen according to an embodiment of the present invention.

The performance game screen for the performance game according to the embodiment of the present invention may display an operation time for the performance presentation, i.e. the PI for displaying the input of the IN to the user, may be displayed in the movable type or in the fixed type. FIG. 2A illustrates an example of the performance game screen when the PI is in the fixed type and FIG. 2B illustrates an example of the performance game screen when the PI is in the movable type.

Referring to FIG. 2A, the performance game screen displays four fixed PIs including PI1, PI2, PI3, and PI4. In this case, the MI, which moves in an upper direction (a direction of an arrow) in accordance with the reproduction flow of the BS and sequentially passes the fixed PIs PI1, PI2, PI3, and PI4, may be displayed on the performance game screen. In this regard, the MI may function to indicate the current reproduction time of the BS and may be also referred to as a movable judgment indicator (judgment unit).

When the MI reaches one fixed PI among the PI1, PI2, PI3, and PI4, the user must generate a corresponding IN through the operation of the input device. At this time, the user can continuously generate the corresponding IN through the continuous operation of the input device for the length (time length) of the corresponding fixed PI.

Referring to FIG. 2B, the performance game screen displays four movable PIs including PI1, PI2, PI3, and PI4, which move in a lower direction in accordance with the reproduction flow of the BS. In this case, the FI may be displayed at a lower end of the performance game screen which the movable PI can reach. The FI may be referred as a fixed judgment indicator (judgment unit).

When one PI among the movable PIs PI1, PI2, PI3, and PI4 reaches the FI, the user must generate the corresponding IN through the operation of the input device. At this time, the user can continuously generate the corresponding IN through the continuous operation of the input device for the length (time length) of the corresponding movable PI.

The performance game screens of FIGS. 2A and 2B have the construction in which the movable indicators (the MI in FIG. 2A and the movable PIs (PI1, PI2, PI3, and PI4 of FIG. 2B)) straightly move along a straight route in a vertical direction (upper direction or lower direction).

Depending on an implementation scheme or the user's selection of the performance game screen, in an aspect of the movement direction of the movable indicators (the MI in FIG. 2A and the movable PIs (PI1, PI2, PI3, and PI4 of FIG. 2B)), the performance game screen may have a vertical construction in which the movable indicator moves in a vertical direction (upper direction or lower direction) or a horizontal construction in which the movable indicator moves in the horizontal direction (left direction or right direction) as illustrated in FIGS. 2A and 2B.

Further, in an aspect of the movement route of the movable indicator (the MI in FIG. 2A and the movable PIs (PI1, PI2, PI3, and PI4 of FIG. 2B)), the performance game screen may have a straight route movement type in which the movable indicator moves along a straight route or a curved route movement type in which the movable indicator moves along a curved route as illustrated in FIGS. 2A and 2B.

Figure 2:
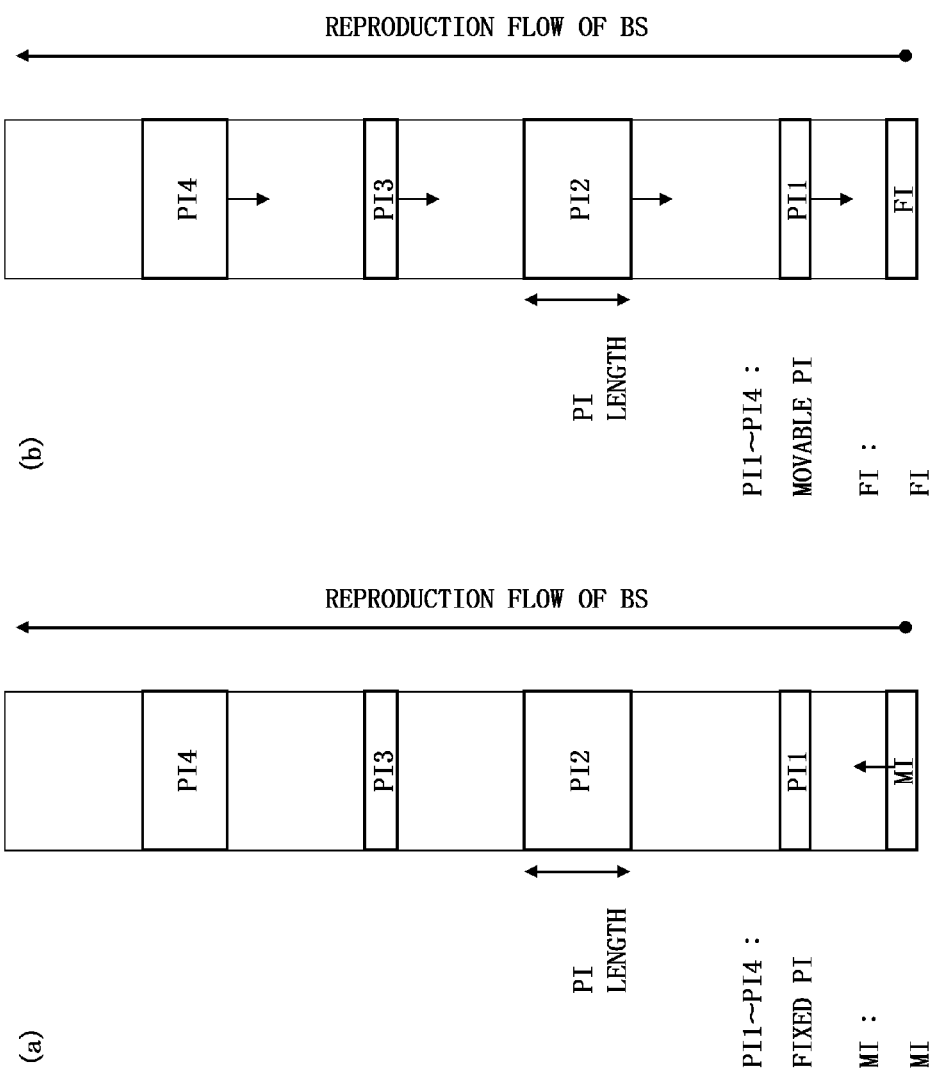
FIGS. 2A and 2B are exemplary diagrams of a performance game screen according to an embodiment of the present invention.

The PI and the other indicators (the MI and the FI) on the performance game screen of FIG. 2 are only illustrated as examples for the convenience of description, and the shapes, colors, and the number thereof may be variously changed. Further, any reproduction bar indicating the reproduction flow of the BS may be further displayed on the performance game screen.

FIGS. 3A and 3B are exemplary diagrams of a performance game scheme according to an embodiment of the present invention.

FIG. 3A illustrates the performance game scheme in the performance game screen construction of FIG. 2A (in which the fixed PI and the MI are displayed), and FIG. 3B illustrates the performance game scheme in the performance game screen construction of FIG. 2B (in which the movable PI and the FI are displayed).

For the performance game, the BS having a predetermined total reproduction time is determined by the user's selection or setting information. The performance sound source to be synchronized with the BS is determined and set in accordance with the user's selection or the setting information. In FIGS. 3A and 3B, for the convenience of description, it is assumed that the performance sound source is the LS (the first performance sound source) synchronized with the total reproduction time of the BS.

The length (entire reproduction time) of the set LS and the length (the entire reproduction time) of the BS are basically identical to each other, but may be different from each other. If the length of the LS is longer than the length of the BS, a stage of the performance game is terminated at an end time of the BS, so that data may be wasted in an amount equal to data of the un-reproduced LS. Therefore, if the BS is set, it is preferable to set the LS having the length identical to that of the set BS, which may be controlled by the sound setting unit 110. For example, the sound setting unit 110 may notify the user of only a list of the LSs having the length identical to that of the set BS, enable the user to select and set the LS from the list, or search for the LS having the length identical to that of the set BS from the pre-stored LSs and automatically set the LS.

As described above, after the setting of the BS and the LS for the performance game, the indicators functioning as a user guidance for the performance game are displayed on the screen. The indicators displayed on the screen include the PI and the corresponding other indicator.

The PI may be the fixed PI as shown in FIG. 3A or the movable PI as shown in FIG. 3B.

As illustrated in FIG. 3A, when the fixed PIs PI1 through PI4 are displayed on the performance game screen, the MI, which moves toward the fixed PIs in accordance with a progress or a speed of the BS, may be displayed on the performance game screen. In this regard, the position of the MI corresponds to a current reproduction position of the BS and the MI may move in any direction. Further, the positions of the fixed PIs may be arranged in a straight path or another path including a curved path, and the movement of the MI may be changed according to the arrangement shape of the positions of the fixed PIs.

Further, as illustrated in FIG. 3B, in the event that the movable PIs PI1 through PI4, which move in accordance with a progress or a speed of the BS, are displayed on the performance game screen, the FI, which the movable PIs move to and reach in accordance with the progress or the speed of the BS, may be displayed on the performance game screen. In this regard, the movable PIs may move in any direction. Further, the movable PIs may move in a straight direction or a curved direction.

Therefore, after the setting of the BS and the LS, and the reproduction and output of the BS are started, the PI and the corresponding other indicators are simultaneously displayed, and the performance game is started with the movement of the movable PI(s). Hereinafter, a presentation scheme, the sound output control, and a presentation judgment scheme for each of FIGS. 3A and 3B will be described. The presentation scheme, the sound output control, and the presentation judgment scheme for each case of FIGS. 3A and 3B is basically identical regardless of the movable PI or the fixed PI.

The presentation scheme, the sound output control, and the presentation judgment scheme in the performance game screen construction illustrated in FIG. 3A is as follows.

Referring to FIG. 3A, the user operates the input device for the length of the fixed PI or a desired time and makes an attempt to present the performance at a timing in which the moving MI is accorded with the fixed PI. The performance game apparatus 100 receives the input of the IN through the input device according to the performance presentation attempt, and makes a sound output control so that the LS is outputted for the input duration of the IN from a specific point of the LS synchronized with the reproduction time of the BS at the input time of the IN. In this regard, the performance game apparatus 100 may make an image output control of outputting the long performance image linked with (corresponding to) the LS.

Referring to FIG. 3A, it is possible to judge the performance through comparing the positions of the fixed PI and the MI at the input time of the IN.

The presentation scheme, the sound output control, and the presentation judgment scheme in the performance game screen construction illustrated in FIG. 3B is as follows.

Referring to FIG. 3B, the user operates the input device for the length of the movable PI or a desired time and makes an attempt to present the performance at a timing in which the movable PIs PI1 through PI4 are accorded with the FI. The performance game apparatus 100 receives the input of the IN through the input device according to the performance presentation attempt, and makes a sound output control so that the LS is outputted for the input duration of the IN from the specific point of the LS synchronized with the reproduction time of the BS at the input time of the IN. In this regard, the performance game apparatus 100 may make an image output control of outputting the long performance image linked with (corresponding to) the LS.

Referring to FIG. 3B, it is possible to judge the performance through comparing the positions of the movable PIs and the FI at the input time of the IN.

In the present invention, the performance judgment and the sound output control (and the image output control) may be independently performed. That is, regardless of the performance judgment result, the corresponding performance sound source (the LS or the SS) may be outputted according to the input time and the input duration of the IN. It is a matter of course that in accordance with the performance judgment result, it is possible to control the state of the output or the output of the corresponding performance sound source (the LS or the SS) according to the input time and the input duration of the IN or generate different sound effects.

Up to now, the examples of the construction of the performance game screen and the corresponding performance game scheme according to the embodiment of the present invention have been described. Hereinafter, the performance game scheme (the performance presentation, the sound output control, the image output control, and the performance judgment) aforementioned with reference to FIGS. 3A and 3B will be described in more detail. Especially, an example of the setting of the performance sound source and the display of the PI, and the IN inputted by the user and the corresponding sound output control will be described with reference to FIGS. 4 to 15. However, in the following description, the presentation scheme, the sound output control, and the presentation judgment scheme are basically the same, regardless of the type of the PI, i.e. the movable PI or the fixed PI, so that the PI to be mentioned hereinafter may be the movable PI or the fixed PI. Further, the other indicators (the FI and the MI) corresponding to the PI will be omitted for the convenience of description.

Figure 4:
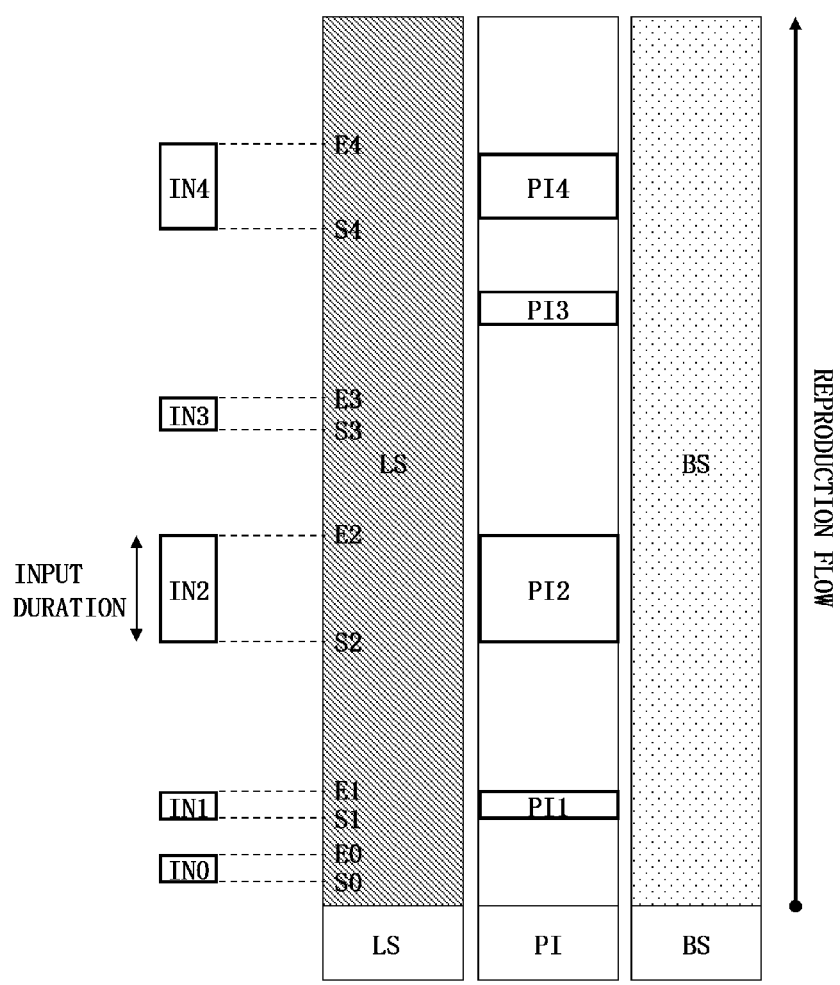
FIG. 4 is a diagram exemplarily illustrating the setting of a long performance sound source, the display of a performance indicator, and the input of a performance input signal in a performance game according to an embodiment of the present invention.

FIG. 4 illustrates an example of the setting of the LS, the display of the PIs PI1 through PI4, and the input of the IN IN0 through IN4 in the performance game according to an embodiment of the present invention.

In FIG. 4, the LS is synchronized with the total reproduction time of the BS, to be set. The four PIs PI1 through PI4 are displayed in a particular length (time length) at a specific section of the BS, and may be the movable PIs which are movable toward the FI in accordance with the reproduction flow of the BS or the fixed PI toward which the movable MI moves in accordance with the reproduction flow of the BS.

In FIG. 4, it is assumed that the user presents the performance five times by using the input device. Then, the performance game apparatus 100 receives the input of the five INs IN0 through IN4 at different input times through the input device. The IN IN0 is inputted at a time S0 and is continued to a time E0, so that the input time and the input duration of the IN IN0 is the time S0 and the duration E0 to S0, respectively. The IN IN1 is inputted at a time S1 and is continued to a time E1, so that the input time and the input duration of the IN IN1 is the time S1 and the duration E1 to S1, respectively. The IN IN2 is inputted at a time S2 and is continued to a time E2, so that the input time and the input duration of the IN IN2 is the time S2 and the duration E2 to S2, respectively. The IN IN3 is inputted at a time S3 and is continued to a time E3, so that the input time and the input duration of the IN IN3 is the time S3 and the duration E3 to S3, respectively. The IN IN4 is inputted at a time S4 and is continued to a time E4, so that the input time and the input duration of the IN IN4 is the time S4 and the duration E4 to S4, respectively.

The performance game apparatus 100 controls the sound output for the LS corresponding to each of the five INs IN0 through IN4.

The result of the sound output control in the case of FIG. 4 in which the LS synchronized with the total reproduction time of the BS is used as the performance sound source will be described with reference of signal graphs of FIG. 5.

FIGS. 5A to 5E are signal graphs illustrating the sound output control in the performance game according to the example of FIG. 4.

Referring to FIG. 5A to 5E, it is assumed that before the user starts the performance game, the BS reproduced from a time S to a time E is set as a sound for the performance game and the LS is synchronized with the total reproduction time S to E of the BS to be set as illustrated in FIG. 5D.

When the user starts the performance game, the BS is reproduced and outputted from the time S to the time E as illustrated in FIG. 5A. Then, the MI passes the four PIs PI1 through PI4 while moving in accordance with the reproduction flow of the BS on the screen as illustrated in FIG. 5C. When the user operates the input device in order to accurately present the performance at a time in which the position of the MI is accorded with the position of the PI, the IN is inputted at every operation time. The INs inputted according to the guidance of the PI are the INs IN1, IN2, and IN4. Further, the user may conduct the performance presentation operation when the MI passes a position with no PI. The INs inputted through the voluntary performance presentation operation by the user without the guidance of the PI are the INs IN0 and IN3. Otherwise, with respect to the PI PI3, the user fails to conduct the performance presentation operation so that the IN is not inputted at the time of the PI PI3. All of the inputted INs IN0 through IN4 may be indicated as FIG. 5E.

The performance game apparatus 100 outputs the corresponding LS whenever the IN is inputted. The output of the LS is illustrated in FIG. 5B. Referring to FIG. 5B, the performance game apparatus 100 starts the output of the LS from the point of the LS corresponding to the input time of the IN and continuously outputs the LS for the input duration of the IN.

Referring to FIGS. 5B and 5E, with respect to the IN IN0 of which the input time is the time S0 and the input duration is the time E0 to S0, the LS is outputted from the point corresponding to the time S0 for the time E0 to S0. With respect to the IN IN1 of which the input time is the time S1 and the input duration is the duration E1 to S1, the LS is outputted from the point corresponding to the time S1 for the time E1 to S1. With respect to the IN IN2 of which the input time is the time S2 and the input duration is the duration E2 to S2, the LS is outputted from the point corresponding to the time S2 for the time E2 to S2. With respect to the IN IN3 of which the input time is the time S3 and the input duration is the duration E3 to S3, the LS is outputted from the point corresponding to the time S3 for the time E3 to S3. With respect to the IN IN4 of which the input time is the time S4 and the input duration is the duration E4 to S4, the LS is outputted from the point corresponding to the time S4 for the time E4 to S4.

Referring to the output of the BS of FIG. 5A and the output of the LS of FIG. 5B, both the LS and the BS are outputted in the sections of the LS output (the section from the time S0 to E0, the section from the time S1 to E1, the section from the time S2 to E2, the section from the time S3 to E3, and the section from the time S4 to E4), and only the BS is outputted in the remaining sections with no output of the LS, so that it is possible to feel the performance presentation effect according to the performance presentation operation of the user.

Figure 6:
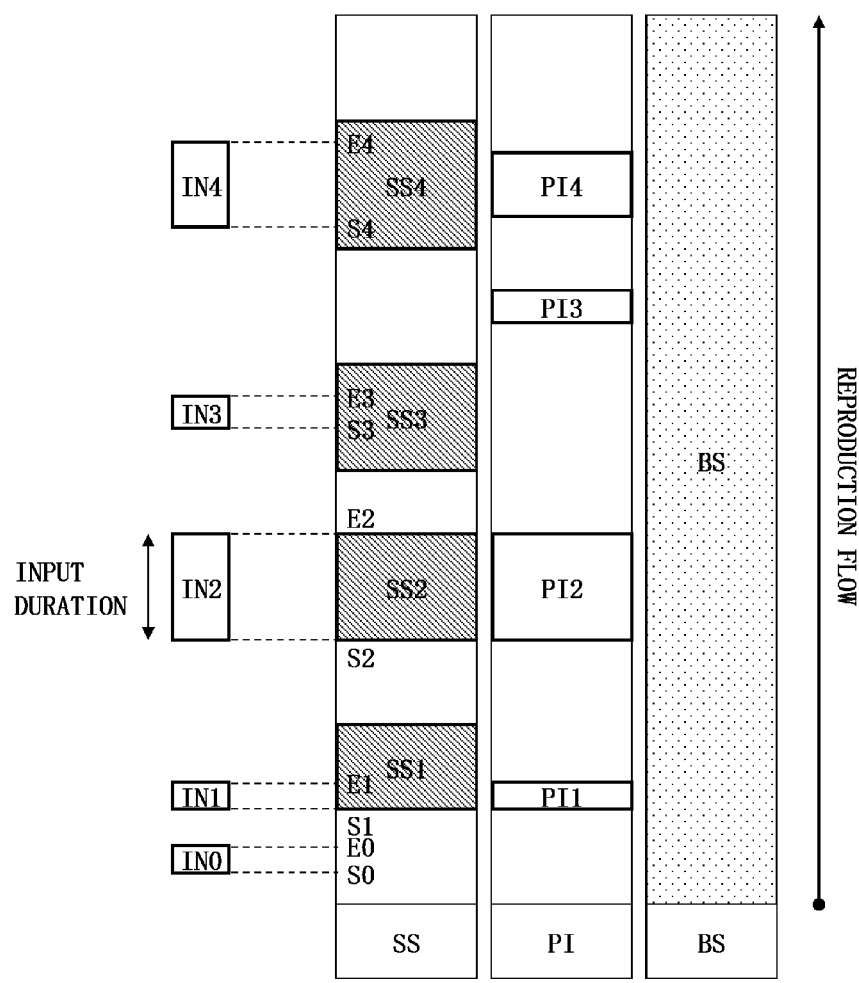
FIG. 6 is a diagram exemplarily illustrating the setting of a short performance sound source, the display of a performance indicator, and the input of a performance input signal in a performance game according to an embodiment of the present invention.

FIG. 6 is a diagram exemplarily illustrating the setting of the SS, the display of the PI, and the input of the IN in the performance game according to an embodiment of the present invention.

In FIG. 6, each of four SSs SS1 through SS4 is synchronized with a specific reproduction section of the BS to be set. The synchronization of the predetermined number of SSs with the BS and the setting of the SS may additionally create the effect of reducing a data volume of the performance sound source in comparison with the setting of the LS synchronized with the total reproduction time of the BS.

Further, the four set SSs SS1 through SS4 may be the different SSs, or one or more of the four SSs SS1 through SS4 may be the same SS in order to reduce a data volume of the performance sound source. Further, at least one among the four SSs SS1 through SS4 may be the SS in a type of a combination of two or more SSs. In this case, it is possible to further achieve the effect of the generation of the unique performance effect, in addition to the effect of reducing the data volume of the performance sound source.

Further, in FIG. 6, the four PIs PI1 through PI4 are displayed with a particular length (time length) at a specific reproduction section of the BS. The PI PI3 among the four PIs PI1 through PI4 is displayed at a position in which the SS is not set. The four PIs PI1 through PI4 may be the movable PIs which can move toward the FI in accordance with the reproduction flow of the BS or be the fixed PI which the movable MI moves to in accordance with the reproduction flow of the BS.

In FIG. 6, it is assumed that the user conducts the performance presentation five times by using the input device. Then, the performance game apparatus 100 receives the input of the five INs IN0 through IN4 at different input times through the input device. The IN IN0 is inputted at the time S0 and is continued to the time E0, so that the input time and the input duration of the IN IN0 is the time S0 and the time E0 to S0, respectively. The IN IN1 is inputted at the time S1 and is continued to the time E1, so that the input time and the input duration of the IN IN1 is the time S1 and the time E1 to S1, respectively. The IN IN2 is inputted at the time S2 and is continued to the time E2, so that the input time and the input duration of the IN IN2 is the time S2 and the time E2 to S2, respectively. The IN IN3 is inputted at the time S3 and is continued to the time E3, so that the input time and the input duration of the IN IN3 is the time S3 and the duration E3 to S3, respectively. The IN IN4 is inputted at the time S4 and is continued to the time E4, so that the input time and the input duration of the IN IN4 is the time S4 and the time E4 to S4, respectively.

The INs IN0 and IN3 among the five INs IN0 through IN4 are the INs inputted through the arbitrary performance presentation operation by the user at the point (time) in which the PI is not displayed. Each of the remaining INs IN1, IN2, and IN4 are the INs inputted through the performance presentation operation by the user in accordance with the guidance of the PIs PI1, PI2, and PI4.

With respect to the five INs IN0 through IN4, the performance game apparatus 100 controls the sound output of the four corresponding SSs SS1 through SS4.

The results of the sound output control in the case in which the four SSs SS1 through SS4 synchronized with the four sections of the BS, respectively, are used as the performance sound sources as illustrated in FIG. 6 will be described with reference of signal graphs of FIGS. 7A to 7E.

FIGS. 7A to 7E are signal graphs illustrating the sound output control in the performance game of the example of FIG. 6.

Figure 7:
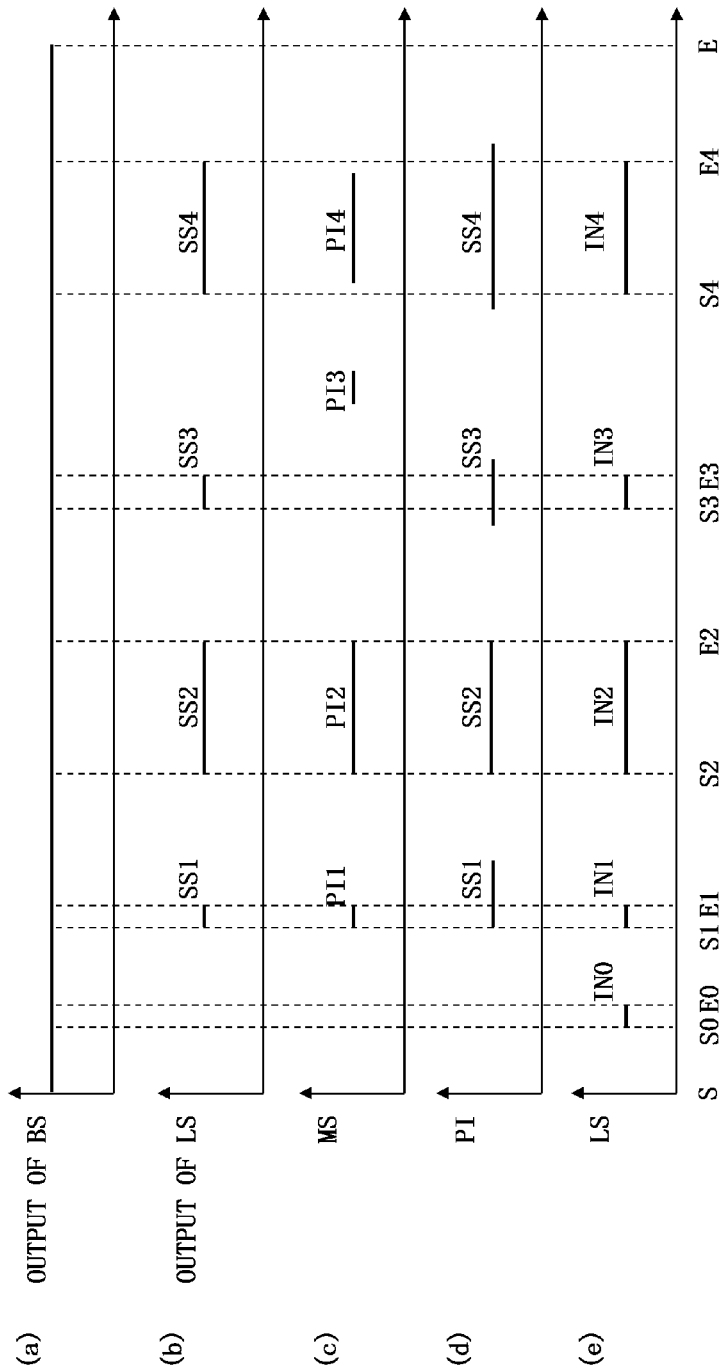
FIGS. 7A to 7E are signal graphs of a sound output control in the performance game of FIG. 6.

Referring to FIG. 7, it is assumed that before the user starts the performance game, the BS reproduced from the time S to E is set as a sound for the performance game, and the four SSs SS1 through SS4 are synchronized with sections adjacent to the time S1 to E1, the time S2 to E2, the time S3 to E3, and the time S4 to E4, respectively, to be set.

When the user starts the performance game, the BS is reproduced from the time S and is continuously outputted by the time E as illustrated in FIG. 7A. Then, the MI passes the four PIs PI1 through PI4 on the screen while moving in accordance with the reproduction flow of the BS as illustrated in FIG. 7C. When the user operates the input device in order to accurately present the performance at a time in which the position of the MI is accorded with the position of the PI, the IN is inputted in every operation time. The INs inputted according to the guidance of the PI are the INs IN1, IN2, and IN4. Further, the user may conduct the performance presentation operation when the MI passes the position with no PI. The INs inputted through the voluntary performance presentation operation by the user without the guidance of the PI are the INs IN0 and IN3. Otherwise, with respect to PI PI3, the user fails to conduct the performance presentation operation so that the IN is not inputted at the time of the PI PI3. All of the inputted INs IN0 through IN4 may be indicated as FIG. 7E.

The performance game apparatus 100 controls the output of the corresponding SS whenever the IN is inputted. The outputs of the SSs SS1 through SS4 are illustrated in FIG. 7B. Referring to FIG. 7B, the performance game apparatus 100 generally starts the output of the corresponding preset SS from the point of the LS corresponding to the input time of the IN and continuously outputs the SS for the input duration of the IN.

Referring to FIGS. 7B, 7D, and 7E, when the performance game apparatus 100 receives the input of the IN IN0 of which the input time is the time S0 and the input duration is the time E0 to S0, the performance game apparatus 100 identifies if there is the SS synchronized in relation with the reproduction time of the BS corresponding to the input time S0 of the IN IN0 among the four SSs SS1 through SS4. In the examples of FIGS. 7A to 7E, there is no SS described above, so that the SS is not outputted for the IN IN0 of which the input time is the time S0 and the input duration is the time E0 to S0.

However, referring to FIGS. 7B, 7D, and 7E, there is the corresponding SS SS1 for the IN IN1 of which the input time is the time S1 and the input duration is the time E1 to S1, so that the corresponding SS SS1 is outputted from the point corresponding to the time S1 for the time E1 to S1. Further, there is the corresponding SS SS2 for the IN IN2 of which the input time is the time S2 and the input duration is the duration E2 to S2, so that the corresponding SS SS2 is outputted from the point corresponding to the time S2 for the time E2 to S2. Further, there is the corresponding SS SS3 for the IN IN3 of which the input time is the time S3 and the input duration is the duration E3 to S3, so that the corresponding SS SS3 is outputted from the point corresponding to the time S3 for the time E3 to S3. Further, there is the corresponding SS SS4 for the IN IN4 of which the input time is the time S4 and the input duration is the duration E4 to S4, so that the corresponding SS SS4 is outputted from the point corresponding to the time S4 for the time E4 to S4. The outputs of the four SSs SS1 through SS4 for the five INs IN0 through IN4 are illustrated as FIG. 7B.

Referring to the output of the BS of FIG. 7A and the output of the SS of FIG. 7B, both the corresponding SS and the BS are outputted in the sections (the section between the time S0 to E0, the section between the time S1 to E1, the section between the time S2 to E2, the section between the time S3 to E3, and the section between the time S4 to E4) in which the four SSs SS1 through SS4 are outputted, and only the BS is outputted in the remaining sections in which the SSs SS1 through SS4 are not outputted, so that it is possible to feel the performance presentation effect according to the performance presentation operation of the user.

Up to now, the output control of the LS or the SS according to the IN has been exemplarily described. Hereinafter, an example of the output control of the BS through the generation of the MS, as well as the output control of the LS or the SS according to the IN, will be described.

Figure 8:
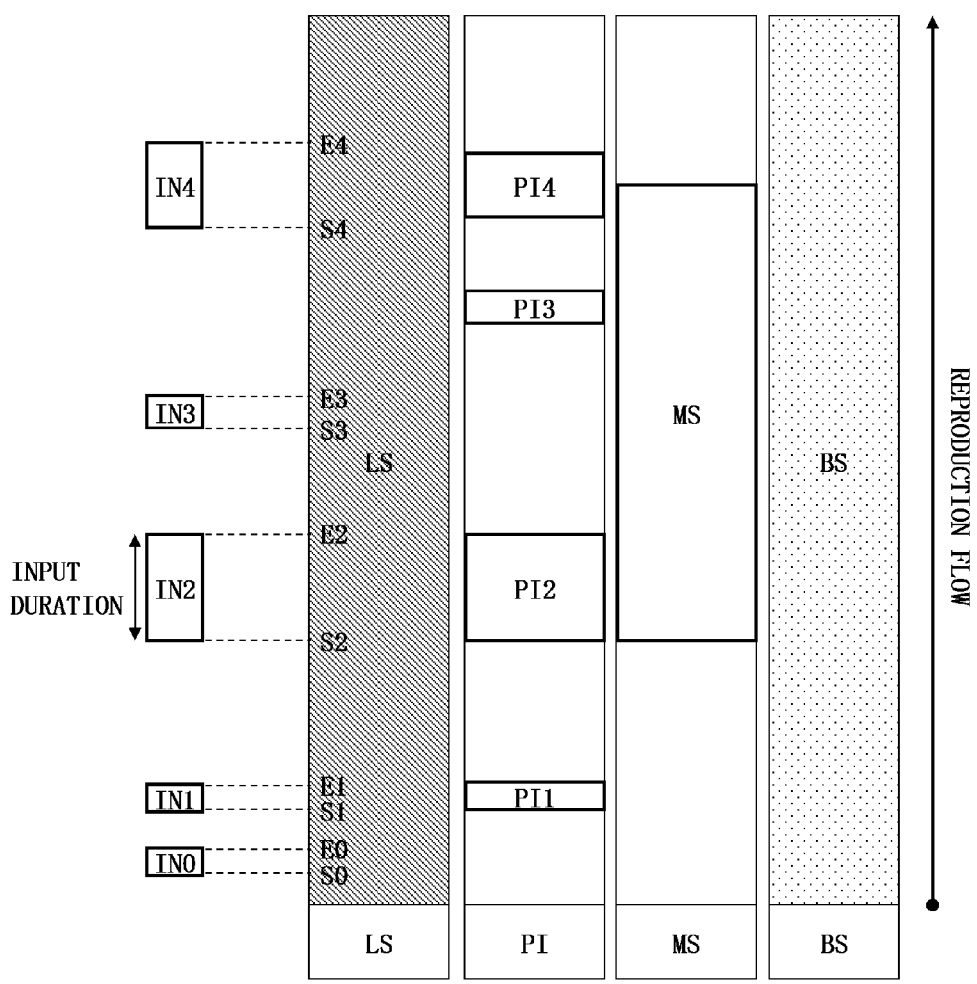
FIG. 8 is a diagram exemplarily illustrating the generation of a mute signal, the setting of a long performance sound source, the display of a performance indicator, and the input of a performance input signal in a performance game according to an embodiment of the present invention.
Figure 9:
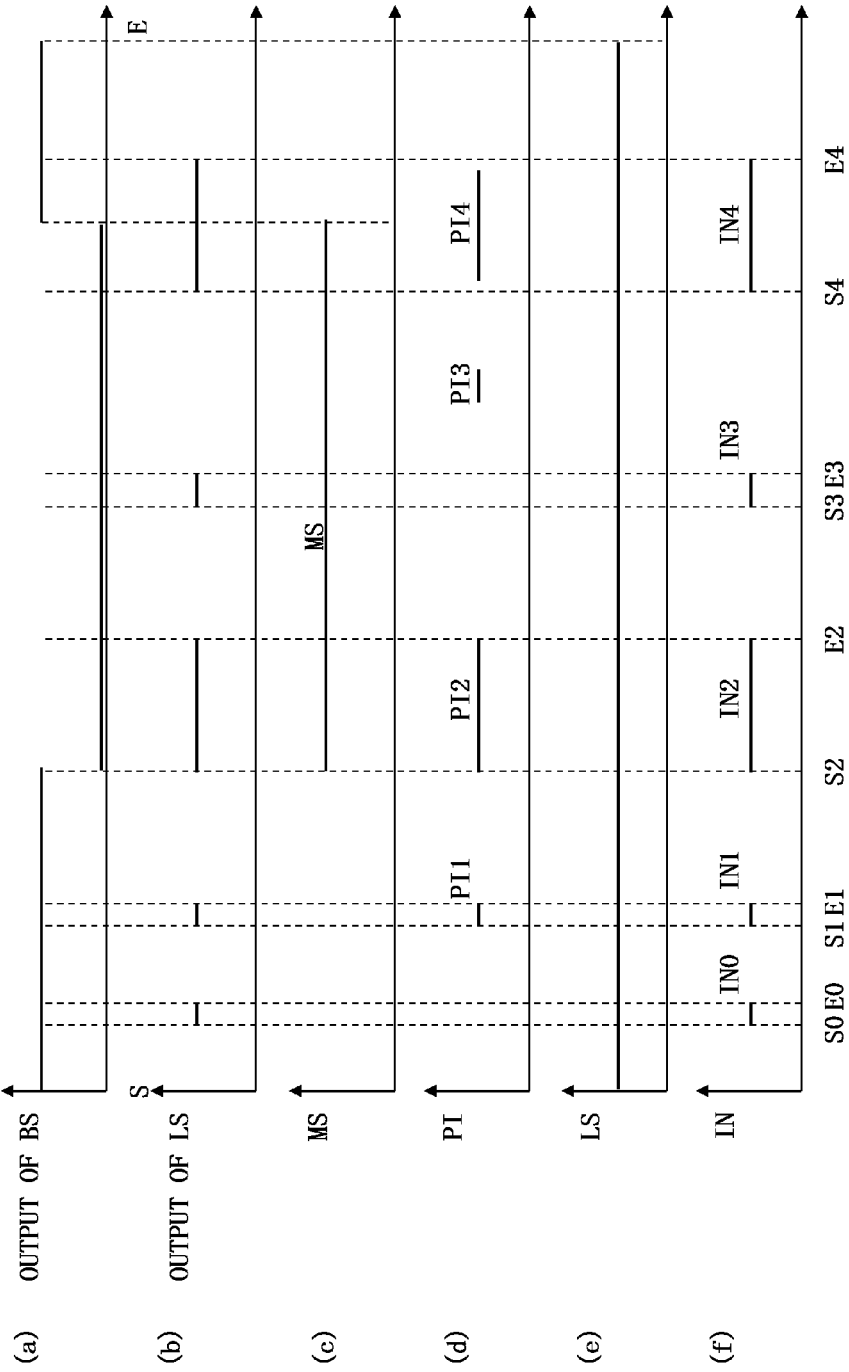
FIGS. 9A to 9F are signal graphs of a sound output control in the performance game of FIG. 8.

FIG. 8 exemplarily illustrates the generation of the MS, the setting of the LS, the display of the PIs PI1 through PI4, and the input of the INs IN0 through IN4 in the performance game according to the present invention. FIG. 8 is identical to FIG. 4, except for the additional generation of the MS.

As illustrated in FIG. 8, the MS is generated from the time S2 to a time between the time S4 to E4 by the mute signal generator 130. The control of the output of the BS will be described with reference to signal graphs of FIGS. 9A to 9F.

FIGS. 9A to 9F are signal graphs illustrating the sound output control in the performance game of the example of FIG. 8. FIGS. 9A to 9F are identical to FIGS. 5A to 5E, except for the addition of the MS graph of FIG. 9C and the different graph of the output of the BS in FIG. 9A.

When the IN is generated in a section including the MS according to the generation of the MS illustrated in FIG. 9C, the performance game apparatus 100 can change an output state of the outputted BS. The change of the output state of the BS in FIG. 9A is to change a volume of the BS to a minimum volume according to the input of the IN IN2 generated in the section including the MS. The change of the output state of the BS is maintained until the existence of the MS and when the MS ceases, the changed volume is reverted to a previous volume.

Figure 10:
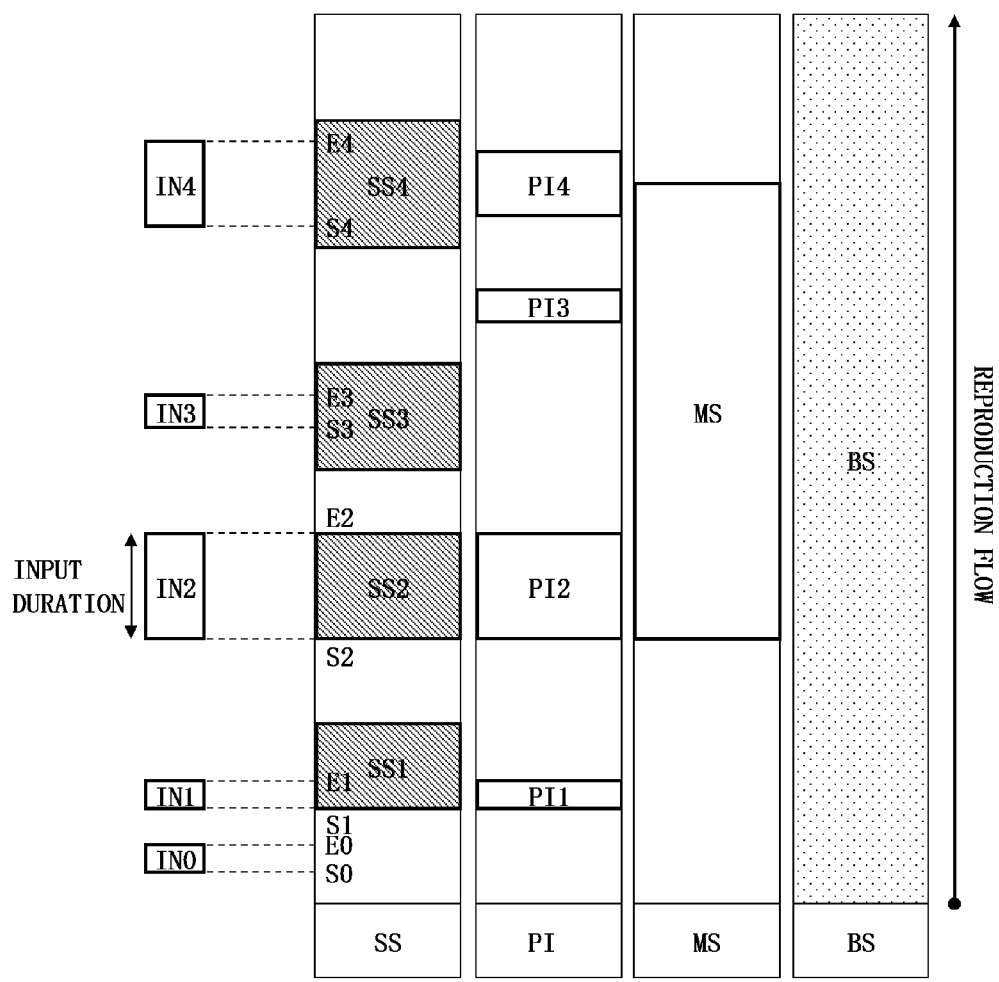
FIG. 10 is a diagram exemplarily illustrating the generation of a mute signal, the setting of a long performance sound source, the display of a performance indicator, and the input of a performance input signal in a performance game according to an embodiment of the present invention.
Figure 11:
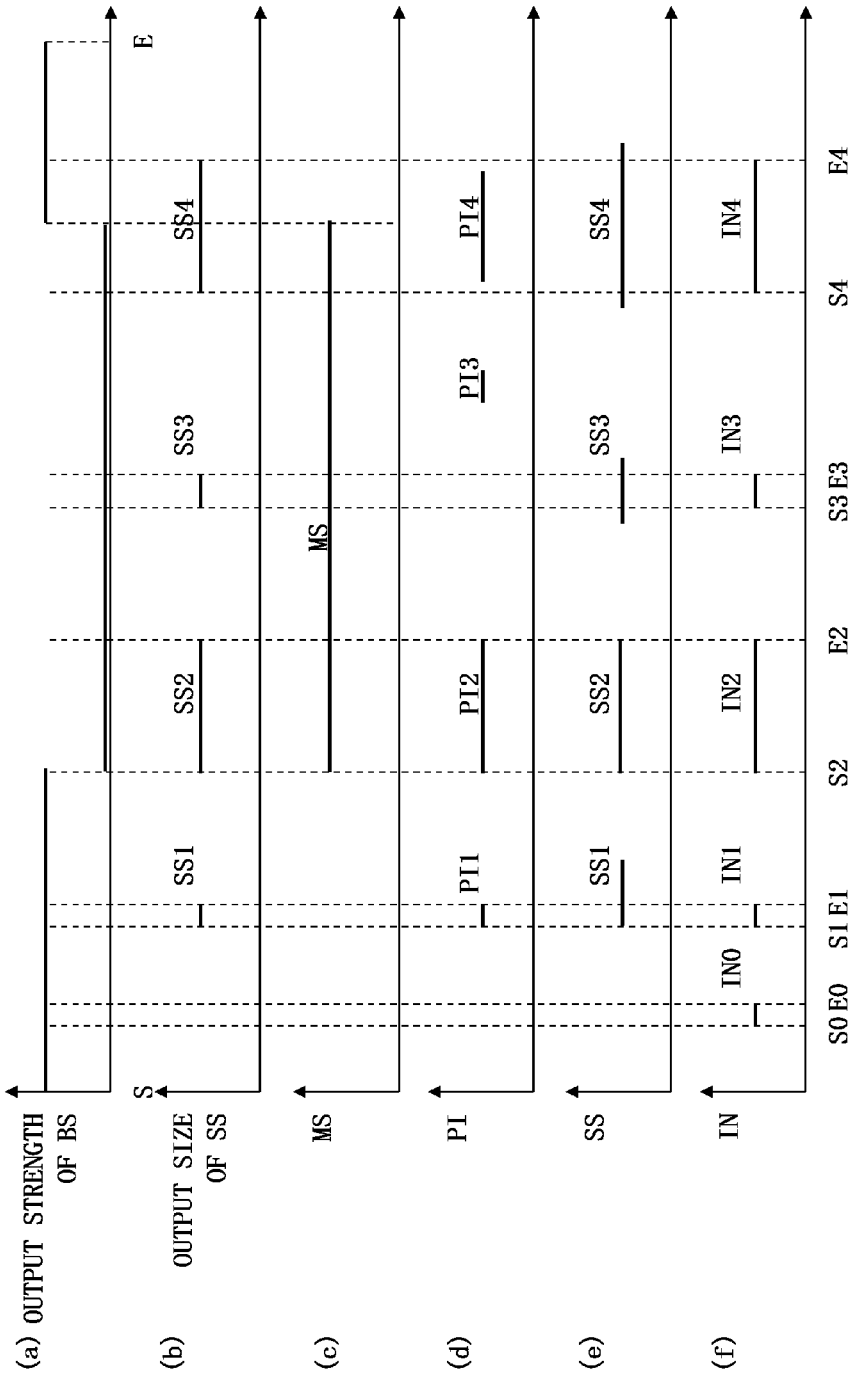
FIGS. 11A to 11F are signal graphs of a sound output control in the performance game of FIG. 10.

FIG. 10 exemplarily illustrates the generation of the MS, the setting of the LS, the display of the PIs, and the input of the INs in the performance game according to the embodiment of the present invention. FIG. 10 is identical to FIG. 6, except for the additional generation of the MS.

As illustrated in FIG. 10, the MS is generated from the time S2 before a time between the time S4 to E4 by the mute signal generator 130. The control of the output of the BS will be described with reference to signal graphs of FIGS. 11A to 11F.

FIGS. 11A to 11F are signal graphs illustrating the sound output control in the performance game of the example of FIG. 10. FIGS. 11A to 11F are identical to FIGS. 7A to 7E, except for the addition of the MS graph of FIG. 11C and the different graph of the output of the BS in FIG. 11A.

When the IN is generated in a section including the MS according to the generation of the MS illustrated in FIG. 11C, the performance game apparatus 100 can change an output state of the outputted BS. The change of the output state of the BS in FIG. 11A is to change a volume of the BS to a minimum volume according to the input of the IN IN2 generated in the section including the MS. The change of the output state of the BS is maintained until the existence of the MS and when the MS ceases, the changed volume is reverted to a previous volume.

Figure 12:
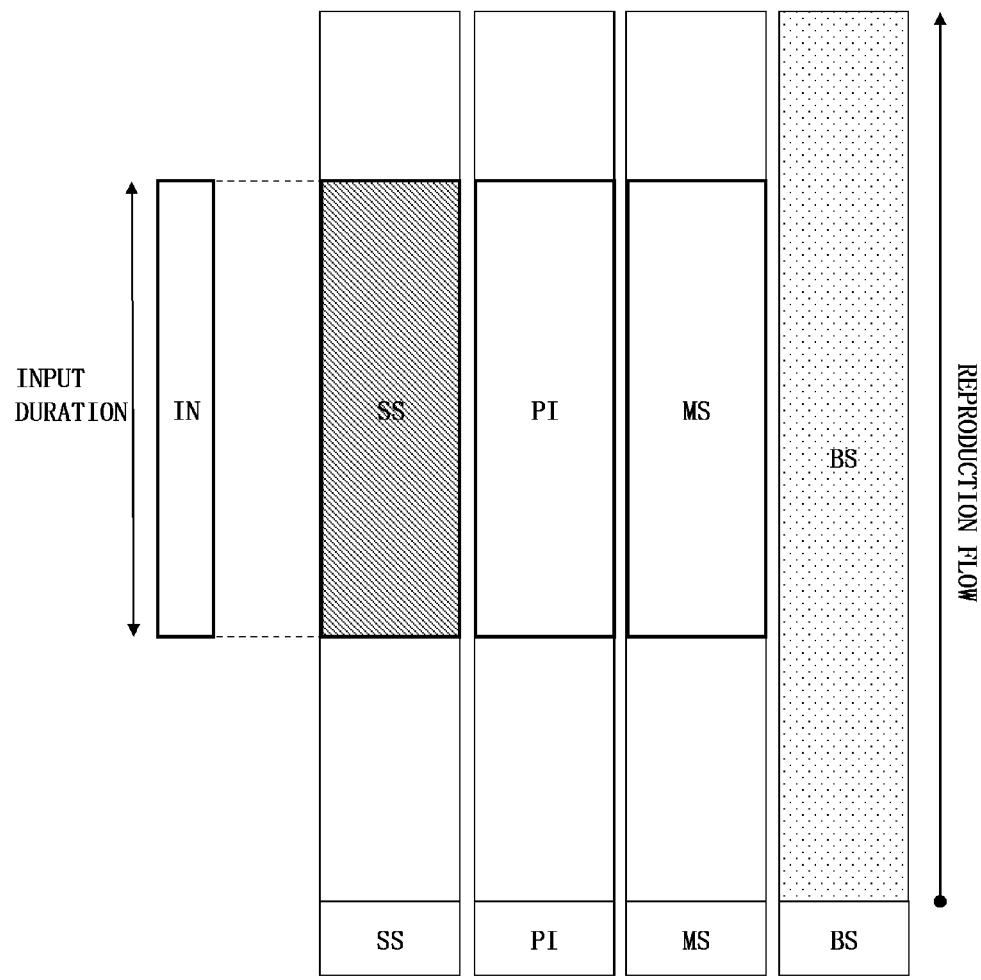
FIG. 12 is a diagram exemplarily illustrating the setting of a short performance sound source, a performance indicator, and a mute signal for a sound source conversion effect.

FIG. 12 is a diagram exemplarily illustrating the setting of the SS, the PI, and the MS for a sound source conversion effect.

Figure 13:
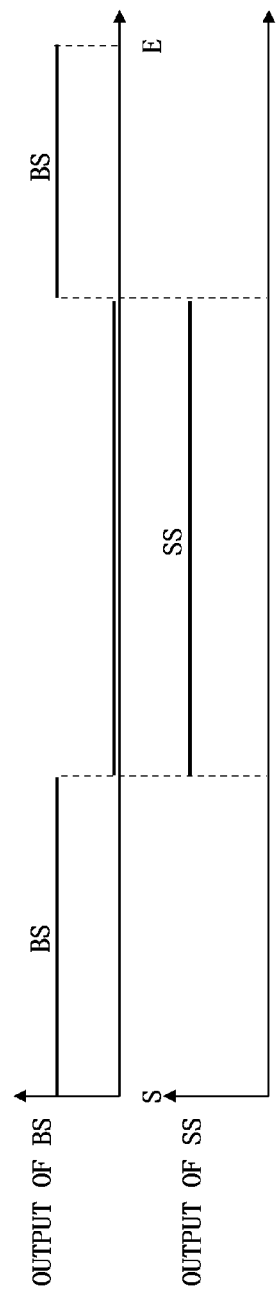
FIG. 13 is a signal graph illustrating a sound source conversion effect according to the example of FIG. 12.

Referring to FIG. 12, when all of the length of the SS, the length of the PI, and the length of the MS are set to be the same and the user generates the IN through the performance presentation operation for the input duration by the length of the PI, it is possible to achieve the sound resource conversion effect that the BS, which has been previously outputted, is changed to the corresponding SS and the SS is reverted to the BS at a ceasing time of the MS as illustrated in FIG. 13.

Figure 14:
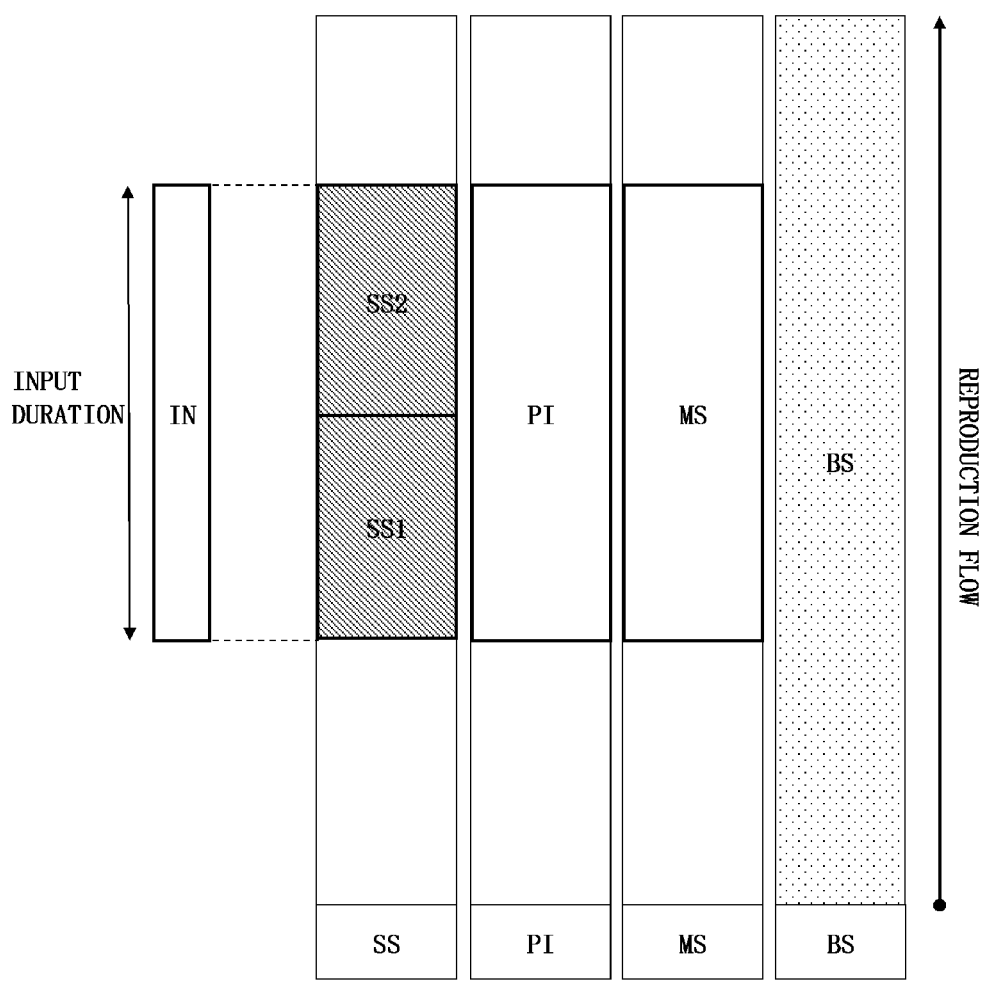
FIG. 14 is a diagram exemplarily illustrating another setting of a short performance sound source, a performance indicator, and a mute signal for a sound source conversion effect.
Figure 15:
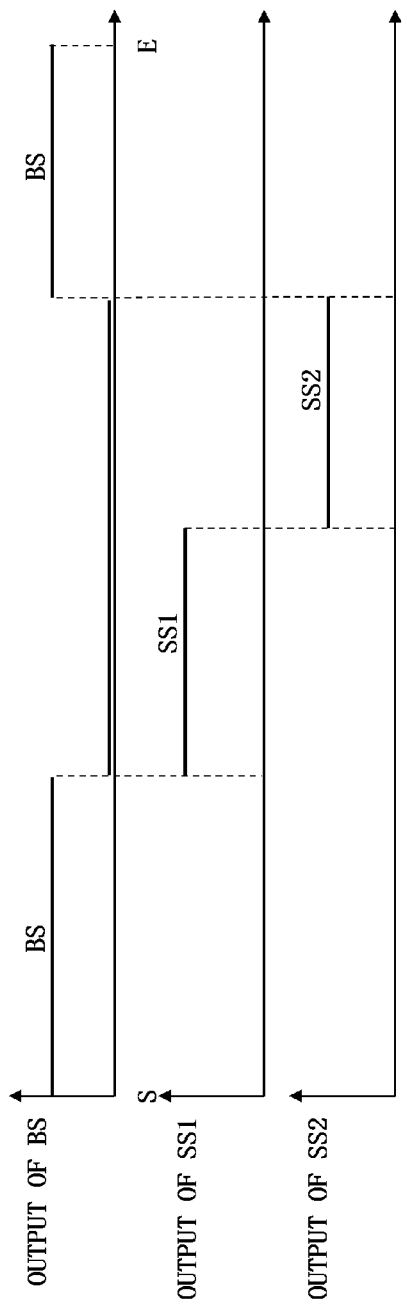
FIG. 15 is a signal graph illustrating a sound source conversion effect according to the example of FIG. 14.

FIG. 14 is a diagram illustrating another setting of the two SSs SS1 and SS2, the PI, and the MS for a sound source conversion effect.

Referring to FIG. 14, when all of a sum of the lengths of the two SSs Ss1 and SS2, the length of the PI, and the length of the MS are set to be the same and the user generates the IN through the performance presentation operation for the input duration by the length of the PI, it is possible to achieve the sound resource conversion effect that the BS is changed to the SS SS1, the SS SS1 is changed to the SS SS2 again at a change time of the setting of the SS, and the SS is reverted to the BS at a ceasing time of the MS as illustrated in FIG. 14.

Figure 16:
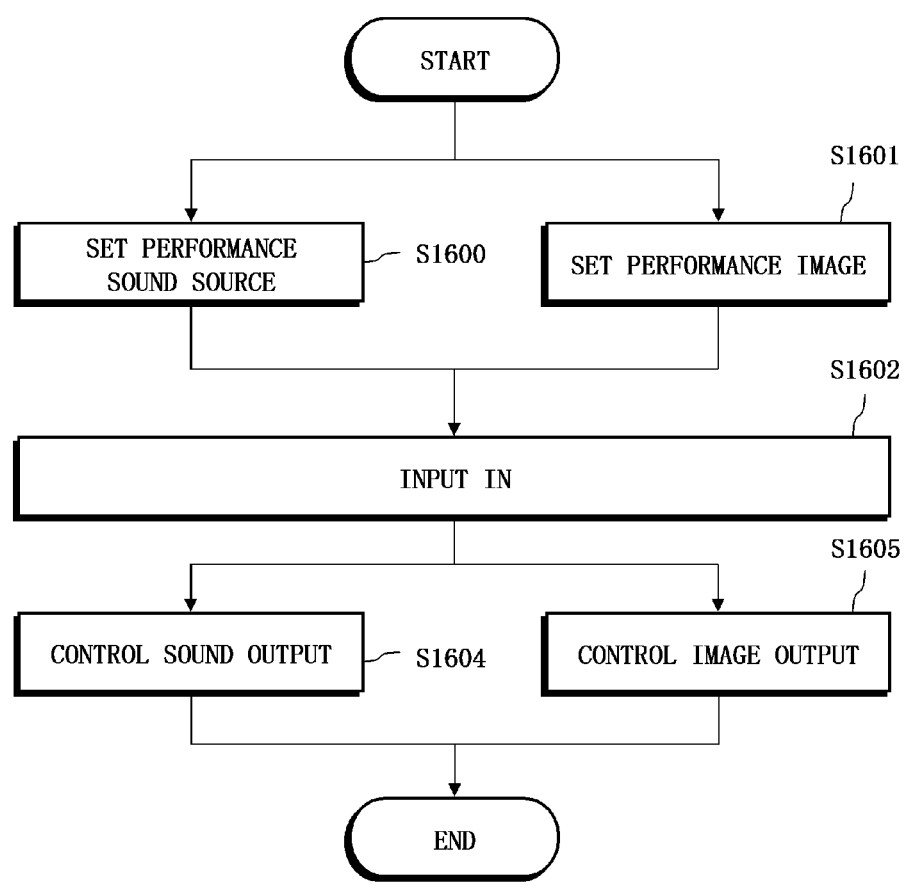
FIG. 16 is a flowchart illustrating a performance game method according to an embodiment of the present invention.

FIG. 16 is a flowchart illustrating a performance game method provided by the performance game apparatus 100 according to an embodiment of the present invention.

Referring to FIG. 16, the performance game method in the performance game apparatus 100 according to the embodiment of the present invention includes a step S1600 of synchronizing a single LS with a BS and setting the LS or synchronizing multiple SSs with one or more sections of the BS, respectively, and setting the SSs, a step S1602 of receiving an input of an IN, a step S1604 of, during the reproduction and output of the BS, when the IN is inputted, outputting the LS from a specific point of the LS during an input duration of the IN or outputting a specific SS from a specific point of a specific SS during an input duration of the IN among the multiple SSs, and controlling an output of the BS based on the input time and the input duration of the IN.

Referring to FIG. 16, the performance game method according to the embodiment of the present invention may further include a step S1601 of setting a background image corresponding to the BS, a long performance image corresponding to the LS or short performance images corresponding to the multiple SSs, prior to the step S1602. In this regard, the performance game method according to the embodiment of the present invention may further include a step S1605 of controlling an output of at the background image, the long performance image, and at least one of the short performance images after the step S1602.

The performance game method according to the embodiment of the present invention may be implemented by a program and be recorded in a computer-readable recording medium.

The program recorded in the recording medium for implementing the performance game method according to the embodiment of the present invention may include a function of synchronizing a single LS with a BS and setting the LS or synchronizing multiple SSs with one or more sections of the BS and setting the SSs, a step S1602 of receiving an input of an IN and a function of, during the reproduction and output of the BS, when the IN is inputted, outputting the LS from a specific point of the LS during an input duration of the IN or outputting a specific SS from a specific point of a specific SS during an input duration of the IN among the multiple SSs, and controlling an output of the BS based on the input time and the input duration of the IN.

An example of the computer-readable recording medium includes ROM, RAM, CD-ROM, a magnetic tape, a floppy disc, and an optical data storage device. Further, the computer-readable recording medium is distributed in network connected computer systems, so that a computer readable code in a distribution scheme may be stored and executed.

Further, functional programs, codes, and code segments for the implementation of the present invention will be easily conceived by programmers skilled in the technical field of the present invention.

Figure 17:
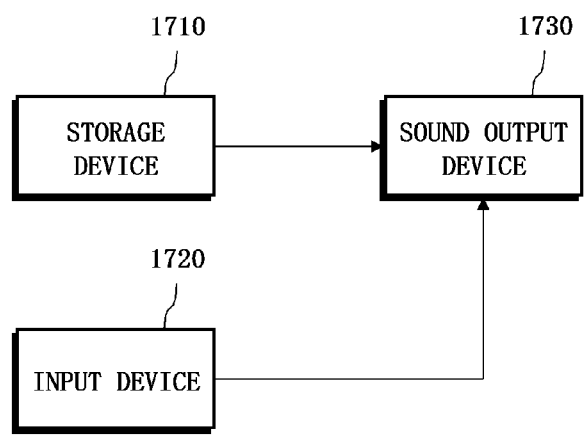
FIG. 17 is a block diagram illustrating a performance game apparatus according to another embodiment of the present invention.

FIG. 17 is a block diagram illustrating a performance game apparatus 1700 according to another embodiment of the present invention.

Referring to FIG. 17, the performance game apparatus 1700 according to another embodiment of the present invention includes a storage device 1710 for storing the BS and data of a preset performance sound source synchronized with a reproduction time of the BS, an input device 1720 for receiving an input of the IN, and a sound outputting device 1730 for outputting the performance sound source synchronized with the reproduction time of the BS corresponding to the input time of the inputted IN among the preset performance sound sources for the input duration of the IN during the output of the BS.

The input device 1720, which is a user operation means for the performance presentation operation, generates the input of the IN. For example, the input device 1720 may be implemented in a button type or a stick type, or a touch screen and a touch pad receiving a touch input or a touch input device for processing a touch input. However, the input device 1720 is not limited thereto and may be implemented with any type of input device having an on/off input function.

The sound output device 1730, which is an output means, such as a speaker, may include a sound reproduction device including a sound codec, etc.

Figure 18:
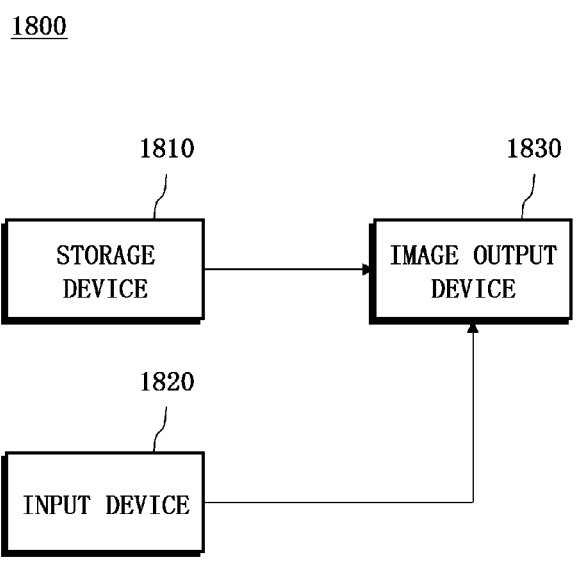
FIG. 18 is a block diagram illustrating a performance game apparatus according to another embodiment of the present invention.

FIG. 18 is a block diagram illustrating a performance game apparatus 1800 according to another embodiment of the present invention.

Referring to FIG. 18, the performance game apparatus 1800 according to another embodiment of the present invention includes a storage device 1810 for storing a BS and data of a preset performance image synchronized with a reproduction time of the BS, an input device 1820 for receiving an input of the IN, and an image outputting device 1830 for outputting the performance image synchronized with the reproduction time of the BS corresponding to the input point of the inputted IN among the preset performance images for the input duration of the IN during the reproduction of the BS.

The input device 1820, which is a user operation means for the performance presentation operation, generates the input of the IN. For example, the input device 1820 may be implemented in a button type or a stick type, or a touch screen and a touch pad receiving a touch input or a touch input device for processing a touch input. However, the input device 1820 is not limited thereto and may be implemented with any input device having an on/off input function.

The image output device 1830, which is an output means, such as a display unit, may include a video reproduction device including a video codec, etc.

Figure 19:
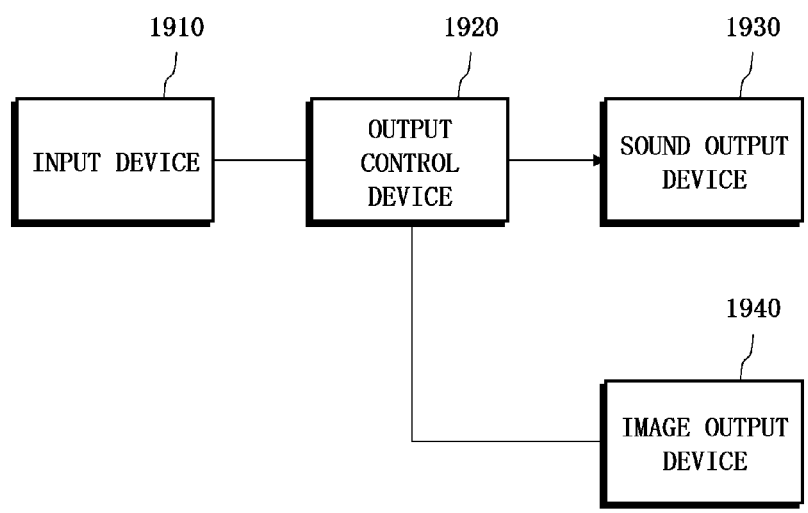
FIG. 19 is a block diagram illustrating a performance game apparatus according to another embodiment of the present invention.

FIG. 19 is a block diagram illustrating a performance game apparatus 1900 according to another embodiment of the present invention.

Referring to FIG. 19, the performance game apparatus 1900 according to another embodiment of the present invention includes an input device 1910 for receiving an input of the IN and an output control device 1920 for, during the reproduction and output of at least one of a sound and an image linked with the sound, when there is a preset control signal at an input time of the IN, controlling an output state of at least one of the sound outputted through a sound output device 1920 and the image outputted through an image output device 1940 in accordance with the control signal.

If the control signal is the MS, the output control device 1920 identifies if there is the MS. When there is the MS, the output control device 1920 may perform at least one of a sound output control of outputting the sound in the smallest volume and an image output control of changing the image to have a particular transparency or color and outputting the changed image.

The input device 1920, which is a user operation means for the performance presentation operation, generates the input of the IN. For example, the input device 1920 may be implemented in a button type or a stick type, or a touch screen and a touch pad receiving a touch input or a touch input device for processing a touch input. However, the input device 1920 is not limited thereto and may be implemented with any input device having an on/off input function.

The output control device 1920 may be implemented with a Central Processing Unit (CPU).

As described above, the present invention can effectively provide the sound-based performance game capable of providing various presentation effects only with the simple presentation operation of the user.

Further, the present invention can effectively provide the sound-based performance game capable of freely and variously presenting the image, as well as the sound, with the simple presentation operation of the user.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An apparatus for a performance game, the apparatus comprising:

a sound setting unit configured to
synchronize a first performance sound source with a background sound to set the first performance sound source, or
synchronize one or more second performance sound sources with one or more sections of the background sound, respectively, to set the one or more second performance sound sources;

a performance input unit configured to receive a performance input signal; and a sound output controller configured to when the performance input signal is received during a reproduction and an output of the background sound, output, based on an input time of the received performance input signal, the first performance sound source from a specific point of the first performance sound source corresponding to the input time, during an input duration of the received performance input signal, or output, based on the input time the received performance input signal, a second performance sound source among the one or more second performance sound sources from a specific point of the second performance sound source corresponding to the input time, during the input duration of the received performance input signal.

2. The apparatus as claimed in claim 1, wherein the sound output controller is further configured to identify a reproduction point of the background sound, which corresponds to the input time of the received performance input signal, and output the first performance sound source with the background sound from a specific point of the first performance sound source corresponding to the identified reproduction point of the background sound, during the input duration of the received performance input signal.

3. The apparatus as claimed in claim 1, wherein the sound output controller is further configured to determine if there is a second performance sound source synchronized with the section of the background sound including an identified reproduction point from the input time of the received performance input signal, among the one or more second performance sound sources, and wherein the sound output controller is further configured to, when there is the synchronized second performance sound source, output the synchronized second performance sound source with the background sound from a specific point of the synchronized second performance sound source corresponding to the identified reproduction point of the background sound, during the input duration of the received performance input signal, and when there is no synchronized second performance sound source, output the background sound without the one or more second performance sound sources.

4. The apparatus as claimed in claim 1, further comprising a mute signal generator configured to generate a mute signal in a section of the background sound.

5. The apparatus as claimed in claim 4, wherein the sound output controller is further configured to, when the performance input signal is received during a generation of the mute signal, decrease a volume of the background sound and output the background sound, or not output the background sound, and when the generation of the mute signal is terminated, revert the volume of the background sound to an original volume and output the background sound, or output the background sound again.

6. The apparatus as claimed in claim 1, further comprising:

an image setting unit configured to set a background image corresponding to the background sound, a first performance image corresponding to the first performance sound source, and one or more second performance images corresponding to the one or more second performance sound sources, respectively; and an image output controller configured to output the background image with at least one of the first performance image and the second performance images.

7. The apparatus as claimed in claim 6, further comprising a mute signal generator configured to generate a mute signal in a section of the background sound, wherein the image output controller is further configured to output the background image corresponding to the background sound during the reproduction of the background sound, and wherein the image output controller is further configured to, when the performance input signal is received, output the background image based on the input time and the input duration of the received performance input signal, and output the first performance image from the specific point of the first performance sound source during the input duration or the second performance image from the specific point of the second performance sound source during the input duration.

8. The apparatus as claimed in claim 7, wherein the image output controller is further configured to, when the performance input signal is received during the generation of the mute signal in the background sound, change a transparency or a color of the background image, and output the changed background image or not output the background image, and wherein the image output controller is further configured to, when the generation of the mute signal is terminated, revert the transparency or the color of the background image to an original state, and output the reverted background image or output the background image again.

9. The apparatus as claimed in claim 1, further comprising a screen display unit configured to display one or more performance indicators for displaying a reception of the performance input signal, on a screen.

10. The apparatus as claimed in claim 9, wherein each of the performance indicators is a fixed type fixedly displayed on the screen or a movable type displayed while moving along a reproduction flow of the background sound.

11. The apparatus as claimed in claim 10, wherein the screen display unit is further configured to, when the performance indicator is the fixed type, further display a moved indicator displayed while moving in accordance with the reproduction flow of the background sound, and wherein the screen display unit is further configured to, when the performance indicator is the movable type, further display a fixed indicator at a position which the performance indicator moves to and reaches.

12. The apparatus as claimed in claim 9, wherein the screen display unit is further configured to display at least one of the performance indicators at a position adjacent to a set point of displaying an output of the second performance sound source.

13. The apparatus as claimed in claim 9, wherein the screen display unit is further configured to display the one or more performance indicators in a corresponding length to the input duration of the performance input signal.

14. The apparatus as claimed in claim 13, further comprising a performance judgment unit configured to, when the performance input signal is received, compare a position of one performance indicator among the one or more performance indicators with a position of another performance indicator among the one or more performance indicators at the input time of the performance input signal and judge if the input time of the performance input signal is a correct timing of a performance presentation, or compare the input duration of the performance input signal with a displayed length of the one or more performance indicators and judge if the input duration is a correct duration of the performance presentation.

15. The apparatus as claimed in claim 14, wherein the sound output controller is further configured to control an output time or an output of at least one of the first performance sound source and the second performance sound source, based on a judgment result of at least one of the timing and the duration of the performance presentation by the performance judgment unit, and wherein the image output controller is further configured to control an output time or an output of at least one of the first performance image corresponding to the first performance sound source and the one or more second performance images corresponding to the second performance sound sources, based on the judgment result of at least one of the timing and the duration of the performance presentation by the performance judgment unit.

16. The apparatus as claimed in claim 14, wherein the sound output controller is further configured to output a sound effect corresponding to an incorrect performance, based on a judgment result by the performance judgment unit, and wherein the image output controller is further configured to output an image effect corresponding to the incorrect performance, based on the judgment result by the performance judgment unit.

17. The apparatus as claimed in claim 1, wherein the first performance sound source and each of the second performance sound sources are at least one of preset performance music and sound, and the second performance sound sources are all different.

18. A method for a performance game, the method comprising:

synchronizing a first performance sound source with a background sound to set the first performance sound source, or synchronizing one or more second performance sound sources with one or more sections of the background sound, respectively, to set the second performance sound sources;

receiving a performance input signal;

when the performance input signal is received during a reproduction and an output of the background sound, outputting, based on an input time of the received performance input signal, the first performance sound source from a specific point of the first performance sound source corresponding to the input time, during an input duration of the received performance input signal, or outputting, based on the input time of the received performance input signal, a second performance sound source among the one or more second performance sound sources from a specific point of the second performance sound source corresponding to the input time, during the input duration of the received performance input signal; and controlling the background sound.

19. A non-transitory recording medium containing a program for an execution of a method for a performance game, the program comprises functions of:

synchronizing a first performance sound source with a background sound to set the first performance sound source, or synchronizing one or more second performance sound sources with one or more sections of the background sound, respectively, to set the second performance sound sources; and when a performance input signal is received during a reproduction and an output of the background sound, outputting, based on an input time of the received performance input signal, the first performance sound source from a specific point of the first performance sound source corresponding to the input time, during an input duration of the received performance input signal, or outputting, based on the input time of the received performance input signal, a second performance sound source among the one or more second performance sound sources from a specific point of the second performance sound source corresponding to the input time, during the input duration of the performance input signal, and controlling an output of the background sound.

20. An apparatus for a performance game, the apparatus comprising:

a storage device configured to store a background sound and one or more preset performance sound sources synchronized with a reproduction time of the background sound;

an input device configured to receive a performance input signal; and a sound outputting device configured to output, during an output of the background sound, the one or more performance sound sources synchronized with the reproduction time of the background sound from a point corresponding to an input time of the received performance input signal, for an input duration of the performance input signal.

21. An apparatus for a performance game, the apparatus comprising:

a storage device configured to store a background sound and one or more preset performance images synchronized with a reproduction time of the background sound;

an input device configured to receive a performance input signal; and an image outputting device configured to output, during a reproduction of the background sound, the one or more preset performance images synchronized with the reproduction time of the background sound from a point corresponding to an input time of the received performance input signal, for an input duration of the performance input signal.

22. An apparatus for a performance game, the apparatus comprising:

an input device configured to receive a performance input signal; and an output control device configured to when there is a preset control signal corresponding to an input time of the received performance input signal during a reproduction and an output of at least one of a sound and an image linked with the sound, control an output state of the at least one of sound and image in accordance with the preset control signal, wherein the output control device is further configured to output the at least one of sound and image from a point corresponding to the input time, during an input duration of the received performance input signal, and wherein the sound is synchronized with a background sound to be outputted with the at least one of sound and image.

23. The apparatus as claimed in claim 22, wherein the output control device is further configured to, if the preset control signal is a mute signal, perform at least one of
- a sound output control for outputting the sound in a minimum volume and
- an image output control for changing a transparency or color of the image to predetermined transparency or color and outputting the changed image.

* * * * *